US007848850B2

(12) United States Patent
Hoshino et al.

(10) Patent No.: US 7,848,850 B2
(45) Date of Patent: Dec. 7, 2010

(54) METHOD FOR DRIVING ROBOT

(75) Inventors: Kiyoshi Hoshino, Tsukuba (JP); Takanobu Tanimoto, Tsukuba (JP)

(73) Assignee: Japan Science and Technology Agency, Kawaguchi-Shi, Saitama (JP)

( * ) Notice: Subject to any disclaimer, the term of this patent is extended or adjusted under 35 U.S.C. 154(b) by 1195 days.

(21) Appl. No.: 10/595,810

(22) PCT Filed: Nov. 15, 2004

(86) PCT No.: PCT/JP2004/016968

§ 371 (c)(1), (2), (4) Date: Jun. 12, 2006

(87) PCT Pub. No.: WO2005/046942

PCT Pub. Date: May 26, 2005

(65) Prior Publication Data

US 2007/0078564 A1 Apr. 5, 2007

(30) Foreign Application Priority Data

Nov. 13, 2003 (JP) ............................. 2003-384402
Jun. 10, 2004 (JP) ............................. 2004-173268

(51) Int. Cl.
*G06K 9/20* (2006.01)
*G05B 17/02* (2006.01)
*G06K 9/00* (2006.01)
*G05B 15/02* (2006.01)

(52) U.S. Cl. .................... 700/264; 700/245; 382/153; 382/181; 382/165; 901/3; 901/4

(58) Field of Classification Search ................. 700/245, 700/264; 382/153, 209, 181, 159, 216, 224; 901/3, 47, 50; 715/863
See application file for complete search history.

(56) References Cited

U.S. PATENT DOCUMENTS 5,887,069 A * 3/1999 Sakou et al. ................ 382/100

6,072,494 A * 6/2000 Nguyen ...................... 715/863
6,236,037 B1   5/2001 Asada et al.

(Continued)

FOREIGN PATENT DOCUMENTS

JP         61-122711     *  6/1986

(Continued)

OTHER PUBLICATIONS

Y. Kuniyoshi. "A Robotic Approach to the Foundation of Communication and Symbols." Proc. of 12th World Congress of Applied Linguistics (AILA) '99), p. 94, 1999.

(Continued)

*Primary Examiner*—Thomas G Black
*Assistant Examiner*—Christine Behncke
(74) *Attorney, Agent, or Firm*—Benesch Friedlander Coplan & Aronoff, LLP

(57) ABSTRACT

A method for driving a robot in a manner of imitation by watching (non-contact manner) based on the movement of a moving object, which has a complicated shape often causing self-occlusion, is provided. A plurality of image data of the robot is associated with pre-arranged operation commands and stored in an image corresponding operation command storing means 11. In order to have the robot perform a movement, the moving objecting caused to perform a desired movement, and at the same time, image data of the moving object are obtained as robot operational image data in time-series. The image data specifying and operation command generating means 14 specifies image data corresponding to the operational image data included in the robot operational image data in time-series among the plurality of image data stored in the image corresponding operation command storing means 11, and provides a pre-arranged operation command corresponding to the specified image data to the robot as an operation command to drive the robot. Owing to this, such problems as complicated shape and self-occlusion of the moving object are eliminated, and the robot performs the movement in an imitating manner by watching.

13 Claims, 21 Drawing Sheets

U.S. PATENT DOCUMENTS

| | | | | |
|---|---|---|---|---|
| 6,421,453 | B1 * | 7/2002 | Kanevsky et al. | 382/115 |
| 6,681,031 | B2 * | 1/2004 | Cohen et al. | 382/103 |
| 6,697,711 | B2 * | 2/2004 | Yokono et al. | 700/245 |
| 6,804,396 | B2 * | 10/2004 | Higaki et al. | 382/181 |
| 7,565,295 | B1 * | 7/2009 | Hernandez-Rebollar | 704/271 |
| 7,665,041 | B2 * | 2/2010 | Wilson et al. | 715/860 |
| 2002/0152077 | A1 * | 10/2002 | Patterson | 704/271 |
| 2002/0181773 | A1 | 12/2002 | Higaki et al. | |

FOREIGN PATENT DOCUMENTS

| | | |
|---|---|---|
| JP | 2000-329511 | 11/2000 |
| JP | 2001-092589 A | 4/2001 |
| JP | 2001-322079 | 11/2001 |
| JP | 2001-344567 A | 12/2001 |
| JP | 2002-163655 A | 6/2002 |
| JP | 2003-080484 | 3/2003 |

OTHER PUBLICATIONS

T. Inamura et al. "Imitation and Primitive Symbol Acquistion of Humanoids by the Integrated Mimesis Loop." Proc. of Intl. Conf. on Robotics and Automation (ICRA 2001), pp. 4208-4213, 2001.

K. Hoshino, "Humanoid Robotic Hand and Its Learning by Watching," vol. 103 No. 455 IEICE Technical Report, The Institute of Electronics, information and Communication Engineers.

T. Shirota et al., "Control of Humanoid Robotic Hand for Humanoid Communication System", vol. 103, No. 166, IEICE Technical Report, the Institute of Electronics, Information and Communication Engineers.

K. Hoshino et al., "High-Speed Retrieval of Similar Hand Images for Robotic Hand Control", IEICE Technical Report, Hip, The Institute of Electronics, Information and Communication Engineerse, 2004-14, pp. 19-26 (Jul. 2004).

* cited by examiner

Fig.11

Computer graphics images of hands of three types having different resolutions (A)

When one image is divided into 4 by 4 areas (B)

When one image is divided into 8 by 8 areas

Fig.16

| Number of image | | 1 | 2 | 3 | 4 | ... | p |
|---|---|---|---|---|---|---|---|
| First principal component | | No. 5 | No. 256 | No. 8375 | No. 982 | ... | No. 7634 |
| | | Score 27.5 | 23.3 | 19.4 | 13.6 | ... | −23.8 |
| Second principal component | | No. 6385 | No. 247 | No. 243 | No. 115 | ... | No. 649 |
| | | Score 13.2 | 10.7 | 9.5 | 9.3 | ... | −15.7 |
| ... | ... | | | | | | |
| Tenth principal component | | No. 9987 | No. 8375 | No. 46 | No. 7426 | ... | No. 11 |
| | | Score 1.2 | 1.1 | 1.0 | 0.9 | ... | −0.9 |

METHOD FOR DRIVING ROBOT

FIELD OF THE INVENTION

The present invention relates to a method for driving a robot, more specifically, relates to a method for driving a robot suitable for having the robot perform the same movement as an image data of a moving object corresponding to the robot or an imitation thereof, whereby having the moving object, corresponding to the robot, or the imitation thereof perform a desired movement in order to have the robot perform.

RELATED ARTS

In a conventional technology of driving a robot by imitating human's movement, for example, when an operator with sensors walks, or when the operator wearing a data glove provided with a plurality of sensors moves his hand, the robot is driven according to the information outputted from those sensors. Non-patent document 1 and non-patent document 2 disclose this kind of conventional technology.

Non-patent document 1: Y. Kuniyoshi, Thesis of "A robotic approach to the foundation of communication and symbols" in Proc. of $12^{th}$ World Congress of Applied Linguistics (AILA'99), 94 page, issued in 1999

Non-patent document 2: T. Inamura, Y. Nakamura, H. Ezaki and I. Toshima, Thesis of "Imitation and primitive symbol acquisition of humanoids by the integrated mimesis loop" in Proc. of Intl. Conf. on Robotics and Automation (ICRA 2001), 4208 page to 4213 page, issued in 2001

DISCLOSURE OF THE INVENTION

Problems to be Solved by the Invention

In many cases of the above conventional technology, however, there arise little ill-posed problems or there are little movements which can not be clearly defined by an output of the sensor or by recognition thereof. And solution is determined by only one clear definition, thereby driving a robot relatively easy. When an ill-posed problem rises, however, a moving object or an imitation thereof of the robot needs to be provided with a sensor all the time, thereby a problem of short versatility being caused.

An object of the present invention is to provide a method for driving a robot by which a moving object or an imitation thereof corresponding to the robot does not require a sensor to be provided with when the robot is actually driven.

Another object of the present invention is to provide a method for driving a robot by which the robot can be driven by using an operational image data as an input data.

A further object of the present invention is to provide a method for driving a robot by which the robot can be steadily driven at high speed, even when the moving object or the imitation thereof is in a complicated structure, or when a part of the moving object is frequently occluded by the moving object itself.

Still another object of the present invention is to provide a method for driving a robot by which the robot can be driven by using a computer graphics image data.

Yet another object of the present invention is to provide a method for driving a robot by which the accuracy for specifying inputted operational image data can be increased.

Still further object of the present invention is to provide a method for driving a robot by which the inputted operational image data and a plurality of image data stored in advance can be quickly matched.

Yet further object of the present invention is to provide a method for driving a robot by which an ill-posed problem can be resolved by imitation and learning by watching.

Means to Solve the Problems

In the method for driving a robot of the present invention, the robot is driven by an operation command, according to the following steps.

First an image data of a moving object corresponding to the robot which performs the same movement as a predetermined movement or an imitation thereof, and a pre-arranged operation command having a corresponding relationship with each other are stored in an image corresponding operation command storing means. The pre-arranged operation command is prepared in advance to obtain the operation command corresponding to the image data. A method for preparing the pre-arranged operation command in advance can be arbitrarily selected. Next, an operational image data of the moving object or the imitation thereof is obtained in time series as a robot operational image data. The operational image data is obtained while the moving object or the imitation thereof performs a desired movement in order to have the robot perform. And an image data corresponding to the operational image data included in the robot operational image data is specified in time series among the image data stored in the image corresponding operation command storing means. Then the pre-arranged operation command corresponding to the specified image data is given to the robot as an operation command. The image data to be stored in the image corresponding operation command storing means can of course include a data of feature quantity indicating feature of a shot image, which is obtained by processing the shot image. Or the image data to be stored in the image corresponding operation command storing means can be a data itself of feature quantity. A method for specifying an image data corresponding to an operational image data included in a robot operational image data can be arbitrarily selected. If the image data to be stored comprises feature quantity, an image data corresponding to the operational image data can be specified according to similarity between feature quantities.

When a robot is actually driven according to the present invention, the robot can be performed the same movement as that of the moving object or the imitation thereof by obtaining an image of the moving object or the imitation thereof corresponding to the robot, without using a sensor. Therefore according to the present invention, the robot can be readily driven by using an image data as an input data.

The correspondency between the image data included in the robot operational image data and each of the plurality of image data stored in the image corresponding operation command storing means can be determined based on the similarity between the two image data. In that case, when the image data corresponding to the operational image data is specified among the plurality of image data stored in the image corresponding operation command storing means, preferably, the plurality of image data for matching are selected based on the feature quantity of the operational image data, and the image corresponding to the operational image data is specified based on the similarity between each of the plurality of image data for matching and the operational image data.

More specifically, according to the present invention, the first step to the fifth step are performed as follows to drive the robot. In the first step, the moving object corresponding to the robot, a plurality of sensors for detecting the movement of the moving object, which are provided at the moving object, and the operation command generating device for generating the operation command based on the output of the plurality of sensors are employed. The operation command generated by the operation command generating device is stored as the pre-arranged operation command, based on the output of the plurality of sensors while the moving object performs the predetermined movements. The moving object described here may typically be the whole body of a human, or any moving parts including hands and legs of the human, and may also be animals.

In the second step, the plurality of image data of the moving object, which performs the predetermined movements in the first step, are obtained. Or, the plurality of the image data of the moving object or the imitation thereof are obtained in time series while the moving object or the imitation thereof performs the same movements as the predetermined movements. "The moving object" of "the moving object or the imitation" may be the same moving object used in the step 1. However, other moving object can be used in this step, if the other one has the substantially same shape and structure as those of the moving object, in other words if the other one has the same joints at the same positions as those of the moving object, and the other one can perform the same movement as that of the moving object. "The imitation thereof" of "the moving object or the imitation thereof" is an imitation of the moving object created by using the imitation creating technique including the computer graphics technique, or is a doll of the moving object or others. In this case, the image data obtained is the imitation image data. Specifically when the computer graphics technique is employed to operate the imitation thereof, the image data of the imitation of the moving object is a computer graphics image data. A method for obtaining the plurality of image data in time series may be arbitrarily selected, the image data can be shot by any of a monocular camera, a binocular camera and a multiple camera.

In the second step when the moving object is a human's hand, if the stored image data includes an image data created by considering the individual difference appearing on the human's hand, the accuracy for specifying the image data in the fifth step described later can be enhanced. The elements causing individual differences include a curvature of positions of metacarpophalangeal jointes of four fingers except a thumb, thrust of metacarpophalangeal joint of the thumb, an opening angle of two neighboring fingers, the difference of reference angles of two opening fingers and warp of the thumb. When the image data, the imitation image data, is created by using the imitation creating technique including the computer graphics technique, the individual differences of these kinds can be easily obtained by changing the image data which has been previously created using the elements of individual differences as a parameter. In another words, they can be easily obtained by changing the parameter which generates the elements of individual differences including the length of bones and the moving angle of the joints.

The image data created in the second step may include resolution modified image data which are created by changing resolution of each of the plurality of image data. This is because the feature of the image may clearly appear by changing the resolution of the image data. If only the image data can be obtained, the resolution of the image data can be easily changed.

In the second step, the surface of the moving object provided with the plurality of the sensors may be covered with a cover. The cover covers the moving object with the plurality of sensors. Then the plurality of the image data of the moving object can be obtained at the same time when the first step is conducted or performed. If the moving object is covered with the cover, unnecessary information on the surface of the moving object can be physically removed. Therefore preferably the covering object has a structure in which the unnecessary information can be removed as much as possible. Also preferably the cover is plain, with a single color without design and unnecessary concavity and convexity. With the covering object of this kind for covering the moving object, the feature included in the image data of the moving object, specifically the feature of the contour of the moving object, can be obtained with high accuracy in a short time.

In the third step, the image data obtained in the second step and the pre-arranged operation command are stored in an image corresponding operation command storing means, whereby each image data included in the plurality of image data obtained in the second step to an pre-arranged operation command. In the third step, the image data to be stored may included an imitation image data(not-taken image data), between the one or preceding image data and the following or succeeding image obtained in the second step as well as the image actually shot. The imitation image data is created by the computer graphics technique. In this case, the pre-arranged operation command corresponding to the imitation image data may be estimated and created based on the pre-arranged operation command corresponding to the one or preceding image data and the pre-arranged operation command corresponding to the following or succeeding image data may be stored with the imitation mage data with associated relatively. With this method, more corresponding data comprising the image data and the pre-arranged operation command can be obtained by using less real image data, thereby greatly easing to prepare the basic data, in which the image data and the pre-arranged operation command are associated.

In the fourth step, in order to have the robot perform a desired movement, the moving object or the imitation thereof performs the desired movement. The operational image data of the moving object or the imitation thereof is obtained in time series as the robot operational image data. In this case, the moving object does not need to be provided with sensors.

In the fifth step, an image data corresponding to the operational image data included in the robot operational image data is specified in time series among the plurality of image data (basic data) stored in the image data corresponding operation command storing means. Preferably the correspondence between the operational image data included in the robot operational image data and the image data stored in the image corresponding command storing means is determined, based on the similarity between the two image data. The method for obtaining the similarity is arbitrarily selected, not limited to the specific method.

In the fifth step, the pre-arranged operation command corresponding to the specified image data is given to the robot as the operation command.

Many ill-posed problems are found in the robot hand of humanoid robot. Therefore wherein the present invention is applied for driving the robot hand, the robot hand can be driven easier according to the present invention than the conventional one. In this case, the human hand or the imitation thereof is to be used as the moving object. In the first step, a data glove for a human hand is used. The data glove has a structure in which the plurality of the sensor are arranged at positions on the glove body. The positions are determined to detect a movement of moving parts of the human hand which corresponds to those of the robot hand.

The more the image data to be basic data increase, or the more the data volume of the database of the image increase, the longer it takes to specify the image data corresponding to the operational image data inputted among the stored image data. To solve this problem, in the third step, the following procedures can be taken when the image data and the pre-arranged operation command are corresponded, and stored in the image corresponding operation command storing means. Firstly, the feature quantity of each of the plurality of the image data is calculated individually (a step of calculating feature quantity). Next, each of the feature quantity of the plurality of the image data is obtained by a principal component analysis and each of a principal component score on each principal component of the plurality of the image data is calculated. And also the number of principal components from the first principal component to a k-th principal component is determined based on a cumulative contribution ratio of the principal component analysis (a step of determining principal component). Furthermore k-kinds of image data source respectively corresponding to the principal components from the first principal components to the k-th principal component are stored. Each of the k-kinds of image data source [table of image information (table)] is obtained by sorting the image data according to the principal component score (storing step). For example, when 15,000 pieces of image data are prepared and 10 kinds of principal component are determined, 15,000 pieces of image data are stored as 10 kinds of image data source which are sorted according to the principal component score (equivalent to the image data of 15,000× 10=150,000 pieces). Each of the image data sorted in the image data source are corresponded to each of the pre-arranged operation command, and stored. In this case, the principal score of the operational image data inputted in the fifth step is obtained, and each of the plurality of image data for matching is selected among the k-kinds of image data source according to the principal component score. The plurality of operational image data having the different kinds of resolution are created by changing resolution of the operational image data, and the principal component score of each of the plurality of operational image data having the different kinds of resolution is obtained. Each of the plurality of image data for matching may be selected among the k-kinds of image data source according to the principal component score. A predetermined number of the plurality of image data for matching are each selected among each of the image data sources according to the principal component score for each of principal component. With this arrangement, the number of the image data to be matched can be decreased, compared to that when matching all the stored image data and the stored operational image data, thereby gaining an advantage that the matching time can be decreased. The similarity between the operational image data and each of the plurality of image data for matching may be determined according to the principal component score, and the image data corresponding to the operational image data may be specified based on the similarity. With this arrangement, if the operational image data having different resolution is created and the similarity is determined by using the factor loading, accuracy for specifying the image data can be enhanced.

Since the first step is conducted in advance, the first step can be separated from the following steps. In the driving method being used for a device for driving the robot, the robot can be driven by using the steps from the second to the fifth.

BRIEF DESCRIPTION OF THE DRAWINGS

FIG. 11 is a diagram showing an example of a local pattern for higher order local autocorrelation function.

FIG. 16 shows an example of lock-up table in which image data are rearranged.

BEST MODE FOR IMPLEMENTING THE INVENTION

Hereinafter, embodiments of a method in accordance with the present invention will be described with reference to the drawings below.

Prior to the description of embodiments, the base of a technique used in this embodiment will be described. When estimating three-dimensional shape of human hand and fingers using a binocular or monocular camera, since the shape of fingers is too complicated and self-occlusion often occurs, there arises an ill-posed problem in recognition of shape. Therefore, it is difficult to estimate the shape at a high speed and with high accuracy without peripheral devices such as infrared range sensors and parallel computing equipment using a plurality of computers (reference: E. Ueda, Y. Matsumoto, M. Imai and T. Ogasawara: "Hand pose estimation using multi-viewpoint silhouette images, "Proc. 2001 IEEE/RSJ Intl. Conf. on Intelligent Robots and Systems (IROS' 2001), pp. 1989-1996, 2001. M. H. Jeong, Y. Kuno, N. Shimada and Y. Shirai: "Recognition of shape-changing hand gestures," IEICE Transactions Division D, E85-D, 10, pp. 1678-1687, 2002. N. Shimada, K. Kimura, Y. Kuno and Y. Shirai: "3-D hand posture estimation by indexing monocular silhouette images," Proc. 6th Workshop on Frontier of Computer Vision, pp. 150-155, 2000). On the other hand, in the control of upper arm of humanoid robot or the like, it is known that there reside such ill-posed problems of, at least, path selection, combination of joint angles and combination of muscle tensions and the like (Y. Uno, K. Kawato and R. Suzuki; a paper titled "Formation and control of optimal trajectory in human multijoint arm movement-minimum torque-change model": Biological Cybernetics, 61, pp. 89-101, 1989.) However, a human well solves the above ill-posed problems, and performs complicated and precise voluntary movements. To speak based on rule of thumb, it may be said that movement experiences with his/her own body; i.e., corporal reality (R. Pfeifer, "Dynamics, morphology, and materials in the emergence of cognition," In Advances in Artificial Intelligence, ed. W. Burgard, A. B. Cremers, and T. Christaller, Proc. KI-99, 23 th Annual German Conference on Artificial Intelligence, 1999) is an important solution of the ill-posed problems in recognition.

Thus, the inventor et al. understand that imitation and learning by watching is extremely effective, or in some cases, only one method that is possible to solve the ill-posed problems in both of the recognition and control, and have developed a robot hand system capable of reproducing finger movements at the same accuracy and processing speed as those of human.

Hereinafter, based on the system, some examples of embodiment of drive method of a robot in accordance with the present invention will be described.

Figure 1:
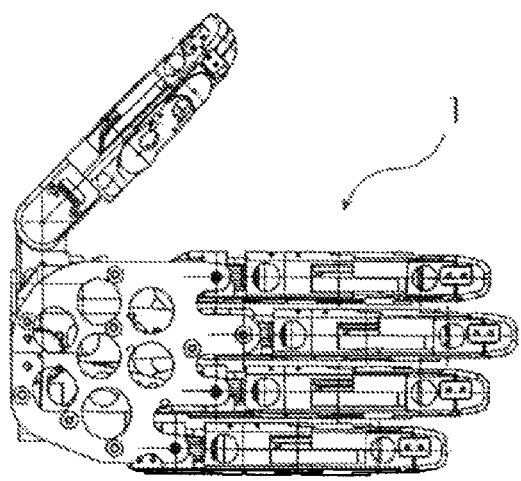
FIG. 1 is a plan view of a robot hand with multiple fingers 1, which is well known in the art, as an object of control in the embodiment developed by the inventor et al.
Figure 2:
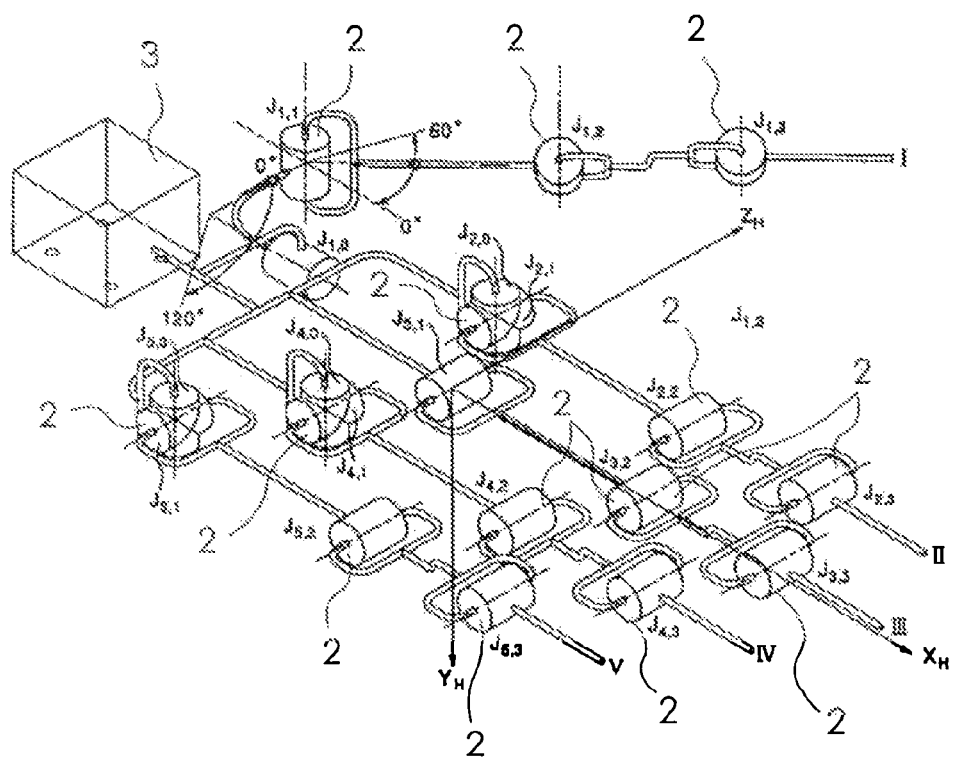
FIG. 2 is a diagram showing an arrangement of actuators disposed within the robot hand in FIG. 1.

First of all, mechanism of a robot hand with multiple fingers (robot) used in the embodiment will be described. FIG. 1 is a plan view of a robot hand with multiple fingers 1, which is well known in the art, as an object of control in the embodiment developed by the inventor et al.; and FIG. 2 is a diagram showing an arrangement of actuators 2 (micro motor incorporated with an encoder) disposed within the robot hand in FIG. 1. It should be noted that the robot hand with multiple fingers is disclosed in the Japanese Patent Application Laid-Open No. 2003-117873. As for the range of movement of the respective joints of the robot hand with multiple fingers 1, degree of abduction/adduction of thumb is 120°; and degree of flection/extension thereof is 60°. Flections and extensions of the five fingers are made being interlocked with second joint respectively; range of movement of the second joint is 112°; range of movement of first joint is 7/10 times of that of the second joint; and range of movement of third joint is 5/7 times of that of the second joint. As for abduction/adduction movement among the fingers, an index finger and a little finger move being interlocked with a third finger, but a middle finger does not move. Also, the range of open/close movement of the third finger is 15°; the range of open/close movement of index finger is 13°; and the range of open/close movement of little finger is 31°. Owing to the arrangement as described above, contact between the thumb and the little finger is made possible, movable range of human fingers is satisfactorily covered.

As the actuator 2 of the respective joints, a DC micro motor is employed. To the second joint of the respective fingers, and for abduction/adduction of the thumb and the open/close movement (abduction) between the flection/extension portions of the four fingers other than the thumb, actuators 2 are provided within a palm respectively. Each of the fingers are controlled with commands received from a controlling computer (not shown), and by changing the voltage applied to the motors of the actuators 2 through a driving device 3 provided with a D/A converter and a driver designated to small servo motors (micro servo) therein. The motor in the actuator 2 is incorporated with an incremental shaft encoder. In addition to detection of axial speed and rotation direction, the output of the encoder can be used for positional control. Such a mechanism is included that angle information of the respective joints is fed back to the controlling computer (not shown) through an encoder of which resolution is increased via gears. The resolution of the encoder itself is 16 [Pulse/Revolution]. The encoders in the open/close portion of the fingers are provided with gears of which reduction ratio is 1/400 respectively, and converted resolution thereof is 6400 [Pulse/Revolution]. The other encoders are provided with gears of which reduction ratio is 1/50 respectively, and converted resolution thereof is 800 [Pulse/Revolution].

Figure 3:
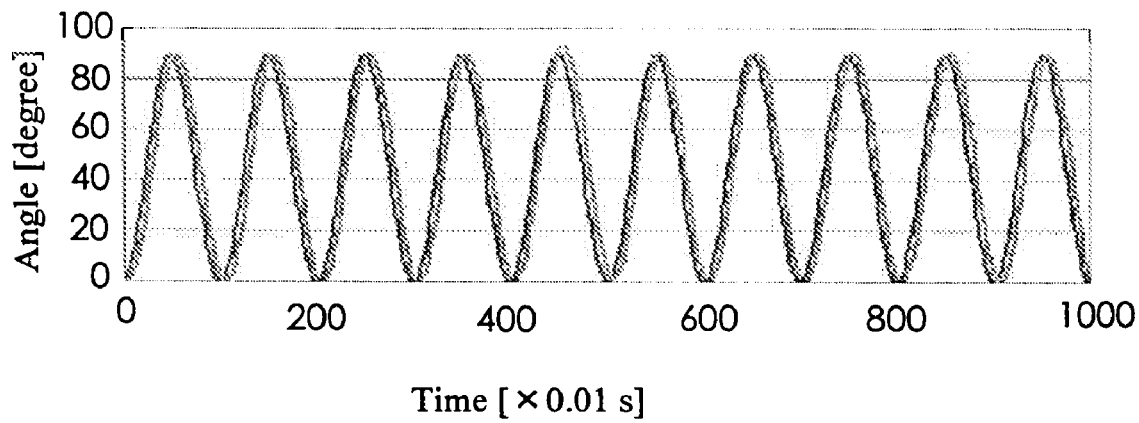
FIG. 3 is a diagram showing a follow-up feature with respect to input of sine wave.
Figure 4:
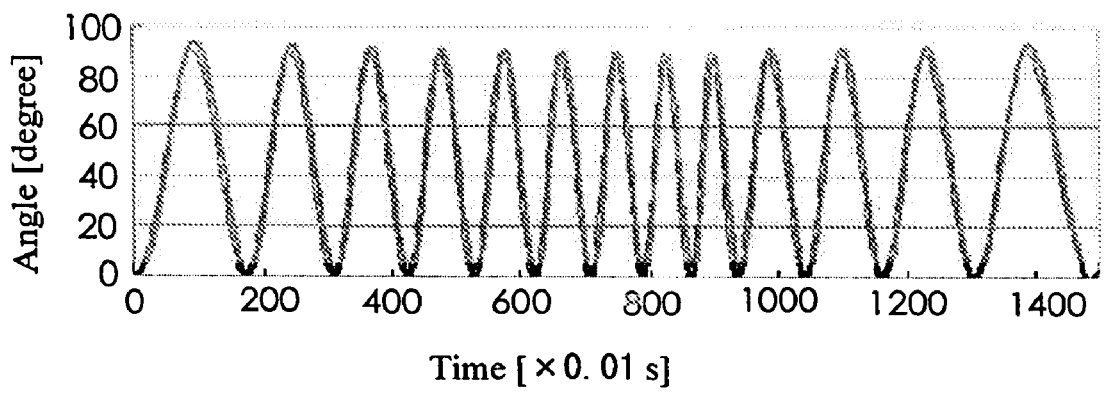
FIG. 4 is a diagram showing a follow-up feature with respect to input of frequency-modulated sine wave.

FIG. 3 and FIG. 4 show follow-up results when time-series angle change command of sine wave or frequency-modulated wave is inputted using a PID control or the like. FIG. 3 shows follow-up feature with respect to the input of sine wave; and FIG. 4 shows follow-up feature with respect to the input of frequency-modulated sine wave. These results demonstrate that satisfactory follow-up characteristics are obtained with respect to operations from a slow operation to a relatively quick operation and with respect to the modulated wave.

Figure 5:
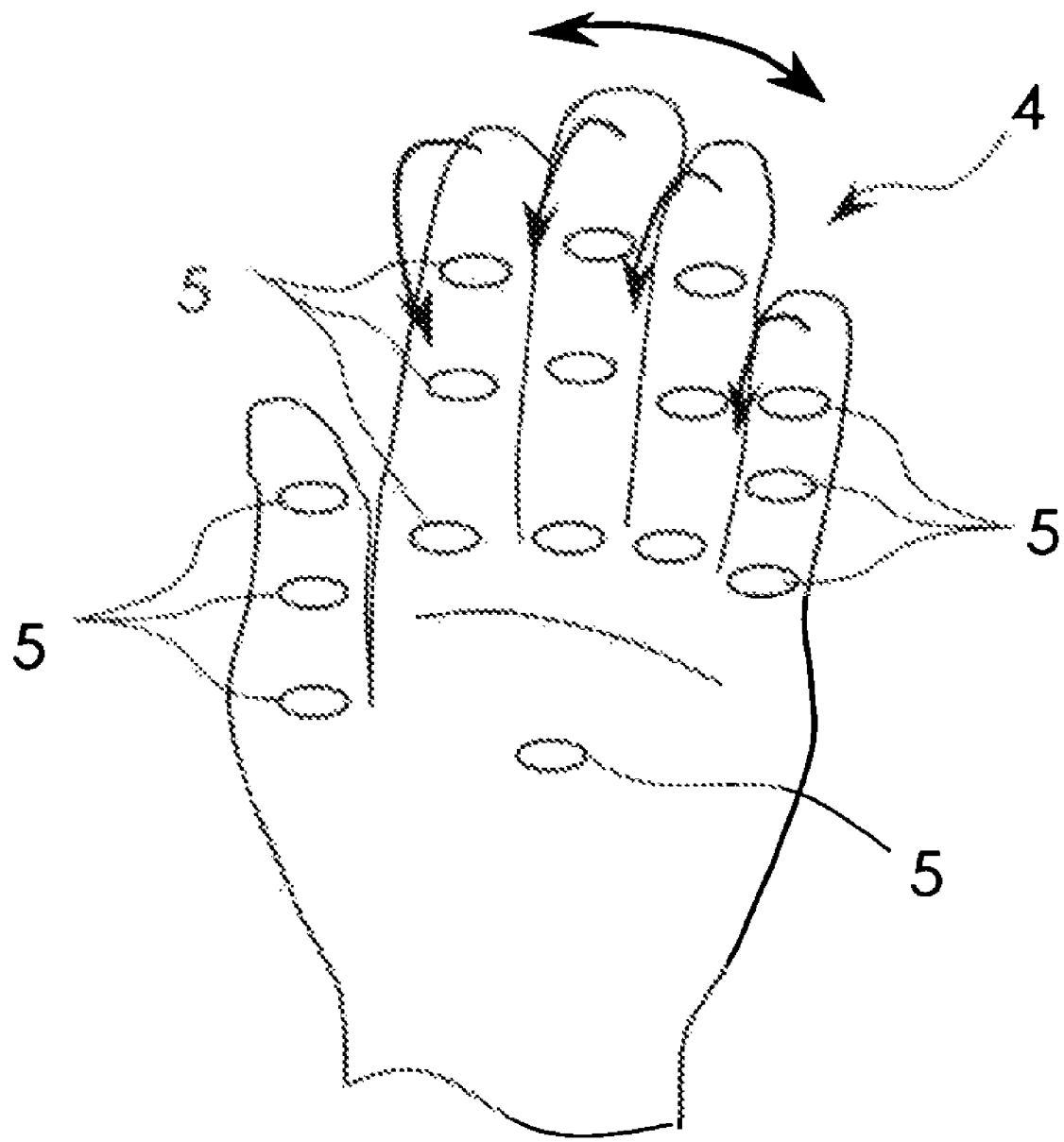
FIG. 5 is a view schematically showing the shape of one embodiment of a data glove used as a remote control device.

FIG. 5 is a view schematically showing a constitution of one embodiment of a data glove 4 used as a remote control device. The data glove 4 has such a constitution that position sensors are distributed and installed in sixteen joint portions of the glove-like body. In particular, a cyberglove (registered trade mark) produced by the Virtual Technologies, Ltd. is employed as the data glove. Each of fingers excluding the thumb is provided with the sensors 5 of the data glove at MP (middle finger joint) and PIP (proximal finger joint) one each; and the thumb is provided with the sensors 5 at MP, PIP and DIP (distant finger joint) respectively. Each of the fingers is provided with the sensors 5 for measuring the abduction, and at the center of the palm, the sensors are provided at total sixteen points. The sensors are specified so as to digitalize the distortion and to output the same at 30 to 40 Hz respectively. The sensor 5 provided at the center of the palm is for measuring the distortion of the entire palm. However, since the corresponding humanoid robot hand does not provided with that mechanism, the center sensor 5 is not used in the embodiment.

When an operator wears the data glove on his/her hand and generates data of movements of human fingers by the data glove, and when the data are inputted to a computer to convert the same into control command values for the robot hand with multiple fingers, the same movement as the movement of the hand of the operator wearing the data glove can be reproduced with the robot hand.

As a simple control method of robot hand using the data glove, the following method is available. That is, the data output from the cyberglove are converted on a three-dimensional coordinate position; and the angle information of the portions corresponding to the joints of the robot hand is taken out in time series; and then, the robot hand is caused to execute the data to perform the movement. However, if the above method is employed, each of the sixteen values outputted from the sensors of the data glove are converted into X-coordinate, Y-coordinate, Z-coordinate, pitch angle, yaw angle and roll angle with respect to each of the joints; and accordingly, approximately one hundred data are generated per one unit time. Therefore, in view of computing efficiency and time efficiency, to extract the data for eight joints, which are necessary to operate the robot hand, from the data and use the same is not the optimum way.

The human four fingers excluding the thumb are considerably influenced from the other four fingers. It is important for the control method and device to express their characteristics in a quantative manner. Therefore, in the embodiment of the present invention, a multiple regression expression is used as the expression for converting data obtained through the data glove to the command values for controlling the robot hand.

To express the joints of the robot hand using a multiple regression expression with respect to the respective joints of the robot hand; i.e., weighted linear sum of the every output from the data glove, it is necessary to carry out multiple regression analysis first to obtain a partial regression coefficient. Therefore, in order to obtain the data for multiple regression analysis, the operator wearing the data glove inputs the joint angle command values to the driving device 3 in accordance with predetermined time-series joint angle patterns to operate the robot hand. The control device, which provides commands to the driving device 3, previously stores joint angle command values of the predetermined time-series joint angle patterns for causing the robot hand 1 to perform movements, which are effective for the multiple regression analysis. And the operator wearing the data glove carries out movements such as bending and stretching and abduction of the fingers with the hand wearing the data glove in accordance with the movements of the robot hand; i.e., imitating. In the present invention, the output of the data glove 4 measured as described above and the time-series joint angle patterns of the robot hand used for the measurement are subjected to the multiple regression analysis to obtain partial regression coefficients of the respective joints. The following expression is a multiple regression expression used in the embodiment.

$$\theta_i(t) = a_{0n} + \sum a_{in} x_{in}(t) \qquad \text{[Expression 1]}$$

Wherein, object variable "$\theta i$" is the command value of the joint angle to be controlled on the robot hand 1; explanatory variable "$X_{in}$" is an output value from the data glove 4; "$a_{in}$" is a partial regression coefficient; and "$a_{On}$" is the rest. Since the values obtained with the multiple regression expression are the values of the joint angles of the respective fingers of the data glove 4, the control can be carried out by using the values as the angle command values for the robot hand.

Figure 6:
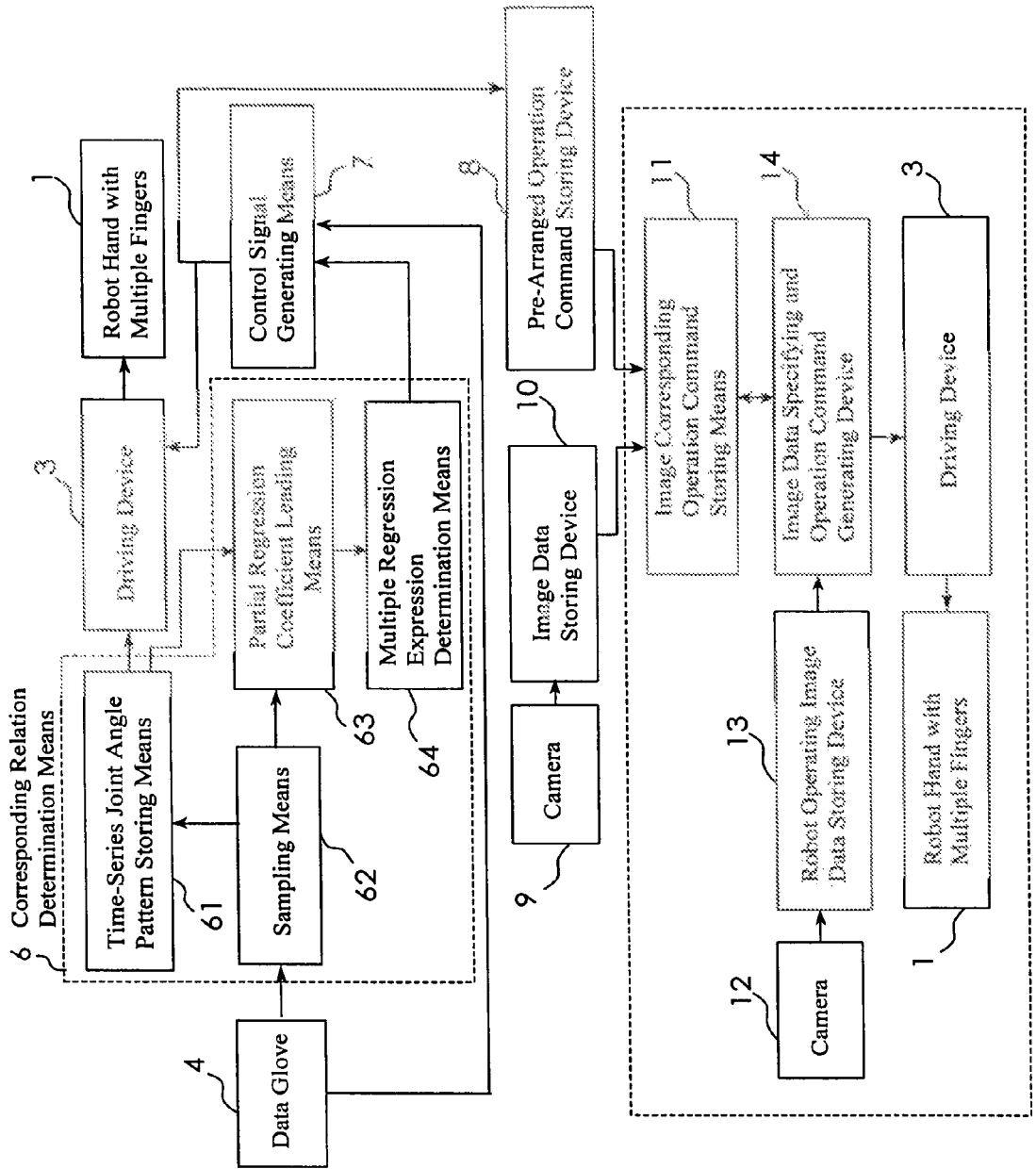
FIG. 6 is a diagram schematically showing a configuration of one embodiment of a system that implements a control device of the robot hand with multiple fingers and a drive method of the present invention.

FIG. 6 schematically shows configuration in one embodiment of the control device for the robot hand with multiple fingers used to obtain pre-arranged operation commands and a device for driving the robot hand using the drive method of the robot of the present invention. The control device shown in FIG. 6, which is used for previously arranging the operation commands, controls the robot hand with multiple fingers 1, which has k joints (k is a positive integer) provided with an actuator respectively, and which operates corresponding to a joint angle command value y indicating the joint angle. And the data glove 4 constitutes the remote control device, which is put on the hand of the operator and outputs n output signals "xn" (n is a positive integer) corresponding to the movement of the hand of the operator. The control device of the robot hand with multiple fingers comprises a corresponding relation determination means 6 and a control signal generating means 7. The corresponding relation determination means 6 is adapted so as to previously determine the relationship between the joint angle command values "y" and n output signals "xn", and k joint angle command values y fork joints. In particular, the corresponding relation determination means 6 comprises a time-series joint angle pattern storing means 61, a sampling means 62, a partial regression coefficient leading means 63 and a multiple regression expression determination means 64.

In a state that joint angle command values are inputted and the robot hand with multiple fingers 1 is operated in accordance with the predetermined time-series joint angle patterns stored in the time-series joint angle pattern storing means 61 with respect to k joints (actually, actuator 2), when the operator operates the data glove 4 imitating the movement of the robot hand with multiple fingers 1, the sampling means 63 carries out sampling of n output signals "xn" in time series m times (m is a positive integer larger than n). Before beginning the sampling, the sampling means 62 issues commands to the time-series joint angle pattern storing means 61, and the time-series joint angle pattern storing means 61 outputs predetermined joint angle command values to the driving device 3. It should be noted that that the time-series joint angle pattern is preferably configured so as to issue arbitrary function commands to the joints (actuators) of the robot hand with multiple fingers so as to move the fingers evenly in an N-dimensional space. Receiving the commands, the driving device 3 operates the robot hand with multiple fingers 1.

The partial regression coefficient leading means 63 carries out a multiple regression analysis based on the time-series joint angle patterns stored in the time-series joint angle pattern storing means 61 and m sets of n output signals "xn" obtained by m times sampling, which are outputted from the sampling means 62 to obtain partial regression coefficients for each of the k joints.

The multiple regression expression determination means 64 determines k multiple regression expressions, which determines the relationship between the joint angle command value "y" and n output signals "xn" for each of the k joints using the partial regression coefficient for k joints determined by the partial regression coefficient leading means 63.

The control signal generating means 7 is adapted so as to obtain k joint angle command values "y" based on the relationship obtained by the multiple regression expression determination means 64 in the corresponding relation determination means 6 and n output signals "xn", and to output control signals (operation commands) representing k joint angle command values "y" to the driving device 3 for driving k joints of the robot hand with multiple fingers. The control signal generating means 7 receives n output signals "xn" as input to obtain k joint angle command values "y" by using k multiple regression expressions obtained by the multiple regression expression determination means 64 as the relationship. These k joint angle command values "y" are the operation commands. The control signal generating means 7 outputs the operation commands at time intervals corresponding to the processing speed in accordance with the movement of the data glove 4. It should be noted that, in the example in FIG. 6, the operation command generating means, which generates operation commands based on the outputs from a plurality of sensors when the moving object (operator hand) carries out a predetermined movement, is comprised of the corresponding relation determination means 6 and the control signal generating means 7.

The multiple regression expression, which represents the relationship between the output of the data glove 4 determined by the multiple regression expression determination means 64 and the joint angles of the robot hand with multiple fingers 1, is expressed in the following formula.

$$HAND_i = a_0[n] + \Sigma a_i[n] \cdot GLOVE_i[n] \qquad \text{[Expression 2]}$$

In the above expression, "HAND" is the joint value of the robot hand with multiple fingers; "a" is the partial regression coefficient; "GLOVE [n]" is the output of the data globe with freedom degree of n; and "i" is the number of joints of the robot hand with multiple fingers. It should be noted that, when the above expression is used, the row is larger than the column; and thus, it is overdetermined expression. Therefore, it is preferred that the partial regression coefficient as the optimum solution is obtained using singular value decomposition.

Figure 7:
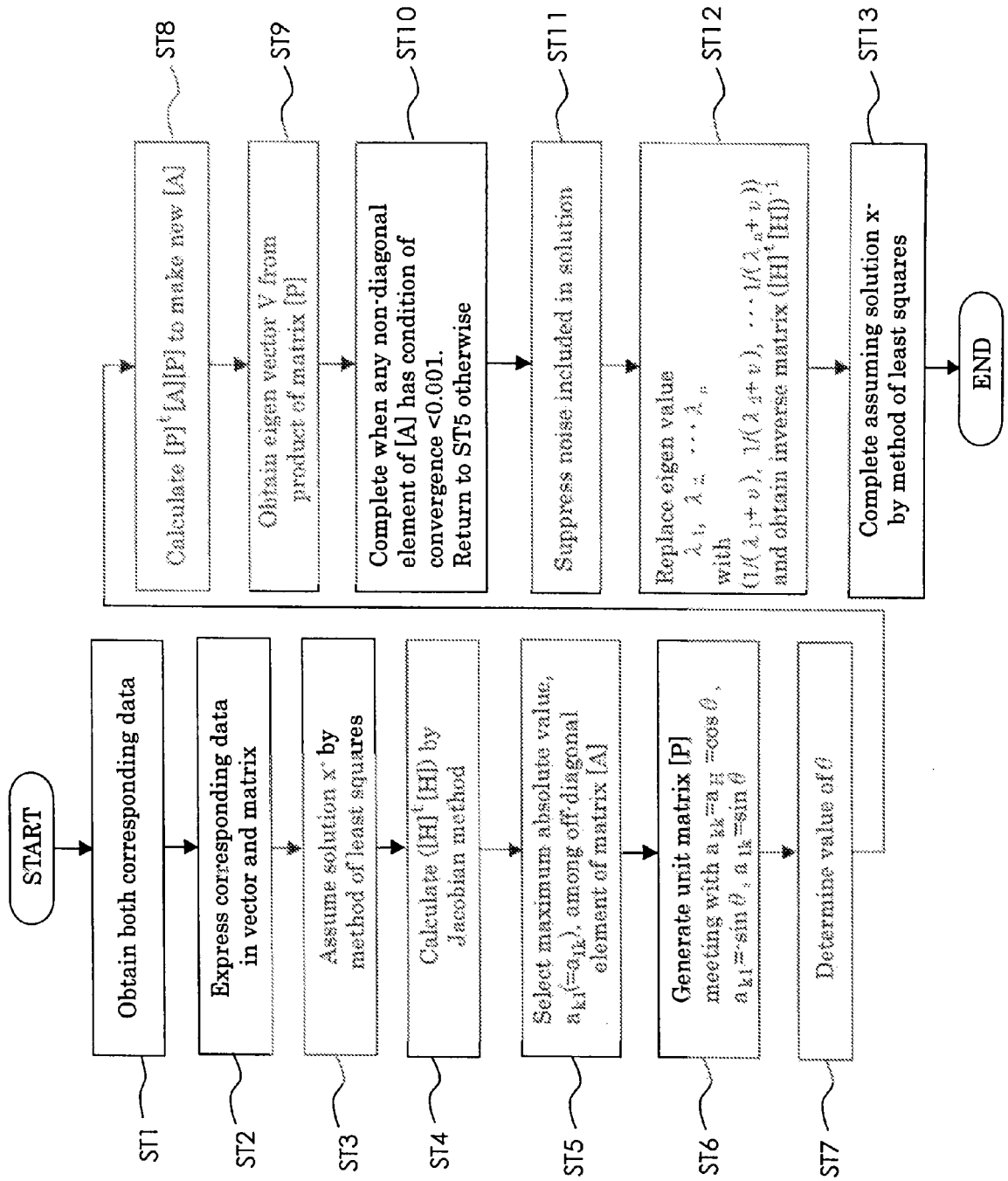
FIG. 7 is a flow chart showing an algorithm of software used for carrying out a principal part of a corresponding relation determination means in FIG. 6 when implementing the same using a computer.

FIG. 7 is a flow chart showing an algorithm of software used for carrying out a principal part of the corresponding relation determination means 6 in FIG. 6 using a computer. First of all, in step ST1, corresponding data between the data glove 4 and the time-series joint angle pattern is obtained. That is, such a function that evenly moves the fingers in the movable range of the robot hand with multiple fingers 1 is issued to the robot hand with multiple fingers 1 to drive the same, fingers of the operator perform the same movement imitating the movement of the robot hand with multiple fingers 1. Assuming that a joint angle or a joint angle command value of the robot hand with multiple fingers 1 be "y", and n outputs of the data glove be "xn", the following expression of time-series data from time 1 to m is obtained.

$$y_1 = x_1 a_{11} + x_2 a_{12} + \cdots + x_n a_{1n} \qquad \text{[Expression 3]}$$
$$y_2 = x_1 a_{21} + x_2 a_{22} + \cdots + x_n a_{2n}$$
$$\vdots$$
$$y_m = x_1 a_{m1} + x_2 a_{m2} + \cdots + x_n a_{mn}$$

It should be noted that, in the above expression, m>n. Also, it is estimated that "x" includes noises such as system noise and quantization error.

Then, in step ST2, when expressing in a form of vector and matrix, the corresponding data are expressed as y=[H]x. In this expression, "y", "x" and "[H]" are expressed as below.

$$y = \begin{bmatrix} y_1 \\ y_2 \\ \vdots \\ y_m \end{bmatrix} \qquad \text{[Expression 4]}$$

$$x = \begin{bmatrix} x1 \\ x2 \\ \vdots \\ xn \end{bmatrix}$$

$$[H] = \begin{bmatrix} a_{11} & a_{12} & \cdots & a_{1n} \\ a_{21} & \cdots & & \\ \vdots & & & \vdots \\ a_{m1} & & \cdots & a_{mn} \end{bmatrix}$$

Then, in step ST3, estimation of solution "x⁻" starts by method of least squares. In the process of the estimation, partial regression coefficient is obtained. The expression used in the method of least squares is the following expression.

$$x^- = ([H]^t[H])^{-1}[H]^t y \qquad \text{[Expression 5]}$$

Then, from step ST4, computing of $([H]^t[H])$ using Jacobian method starts. That is, $([H]^t[H])$ (=[A]) is converted into a similar matrix [B] having a simple form using orthogonal matrix P. That is, in other words, $[P]^{-1}[A][P]=[B]$ is calculated.

Then, in step ST5, in the off-diagonal elements of the matrix [A], the maximum absolute value "$a_{k1}(=a_{1k})$" is selected. And then, in step ST6, unit matrix [p], in which $a_{kk}=a_{11}=\cos\theta$, $a_{k1}=-\sin\theta$, $a_{1k}=\sin\theta$, is created.

Then, in step ST7, values of "c" and "θ" are determined. "θ" is obtained by the following matrix.

$$\theta = \begin{cases} 1/2 \arctan(2a_{k1}/(a_{kk} - a_{11})) & a_{kk} \neq a_{11} \\ \mathrm{sign}(a_{k1})\pi/4 & a_{kk} = a_{11} \end{cases} \qquad \text{[Expression 6]}$$

Wherein, in the above expression, k<1.

Then, in step ST8, $[P]^t[A][P]$ is calculated to obtain new [A]. Then, in step ST9, from the product of the matrix [P], eigen vector V is obtained by the following expression.

$$V = [P]^t_{(m)}[P]^t_{(m-1)} \cdots [P]^t_{(2)}[P]^t_{(1)} \qquad \text{[Expression 7]}$$

In the above expression, "$[P]^t_{(N)}$" is the matrix [P] used for N-th conversion.

Then, in step ST10, in every off-diagonal element of [A], if condition of convergence <0.0001, the process is terminated. If not so, the process returns to step ST5. Here, diagonal element of the matrix [B] is the eigen value.

Then, in step ST11, noises included in the solution are suppressed. In step ST12, by replacing the eigen values ($\lambda_1$, $\lambda_2 \ldots \lambda_n$) with ($1/(\lambda_1+\upsilon)$, $1/(\lambda_2+\upsilon)$, $\ldots 1/(\lambda_n+\upsilon)$) to obtain inverse matrix $([H]^t[H])^{-1}$. Wherein, $([H]^t[H])^{-1} = [U][A]^{-1}[U]^t$. Also, the vector "$u_i$" is the eigen vector of $[H]^t[H]$. Also, $[U] = [u_1, u_2, \ldots u_N]$. Further, $[A]^{-1}$ is expressed as below.

$$[A]^{-1} = \begin{bmatrix} 1/(\lambda_1+\upsilon) & 0 & 0 & 0 & \cdots & 0 \\ 0 & 1/(\lambda_2+\upsilon) & & & & \\ 0 & & & & & \vdots \\ \vdots & & & & & \\ 0 & & & & \cdots & 1/(\lambda_N+\upsilon) \end{bmatrix} \qquad \text{[Expression 8]}$$

Wherein, $\upsilon = \sigma_n^2/\sigma_x^2$. Here, by adding noise element "n⁻" to the right side member of y=[H]x, and by transforming into n⁻=y−[H]x, "$\sigma n^2$" can be calculated. Also, "$\sigma_x^2$" can be directly calculated from "y". And in step ST13, the estimation of solution "x⁻" by method of least squares is terminated.

According to the algorithm in the above flow chart, to obtain the partial regression coefficient, using the method of least squares and the singular value decomposition, the multiple regression analysis is carried out. It should be noted that the above step ST4 to ST10 are the steps, in which the singular value decomposition is carried out.

Figure 8:
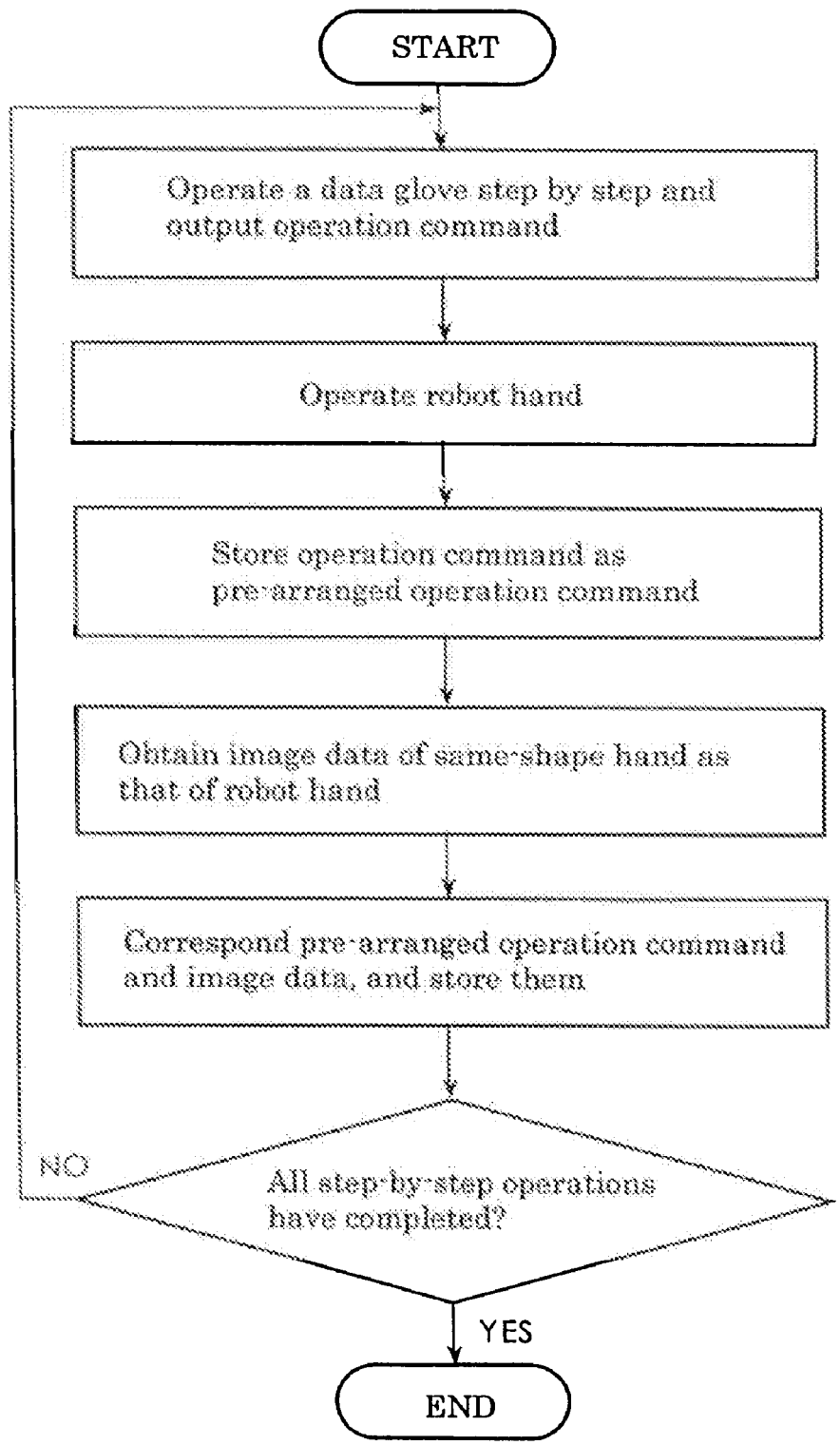
FIG. 8 is a flow chart showing an algorithm of software used for carrying out first to third steps using a computer.

Referring to FIGS. 6 and 8-10, one example of the embodiment in which the robot hand is driven by the method of the present invention will be described. In the first step, in accordance with the embodiment of the present invention, a prearranged operation command storing device 8 stores operation commands generated by the operation command generating means (6, 7) as pre-arranged operation commands based on the output of a plurality of sensors 5 on the data glove 4 when a predetermined movement is made by the hand (moving object) wearing the data glove 4. FIG. 8 shows an algorithm of software used when the storing operation is made with the computer.

Figure 9:
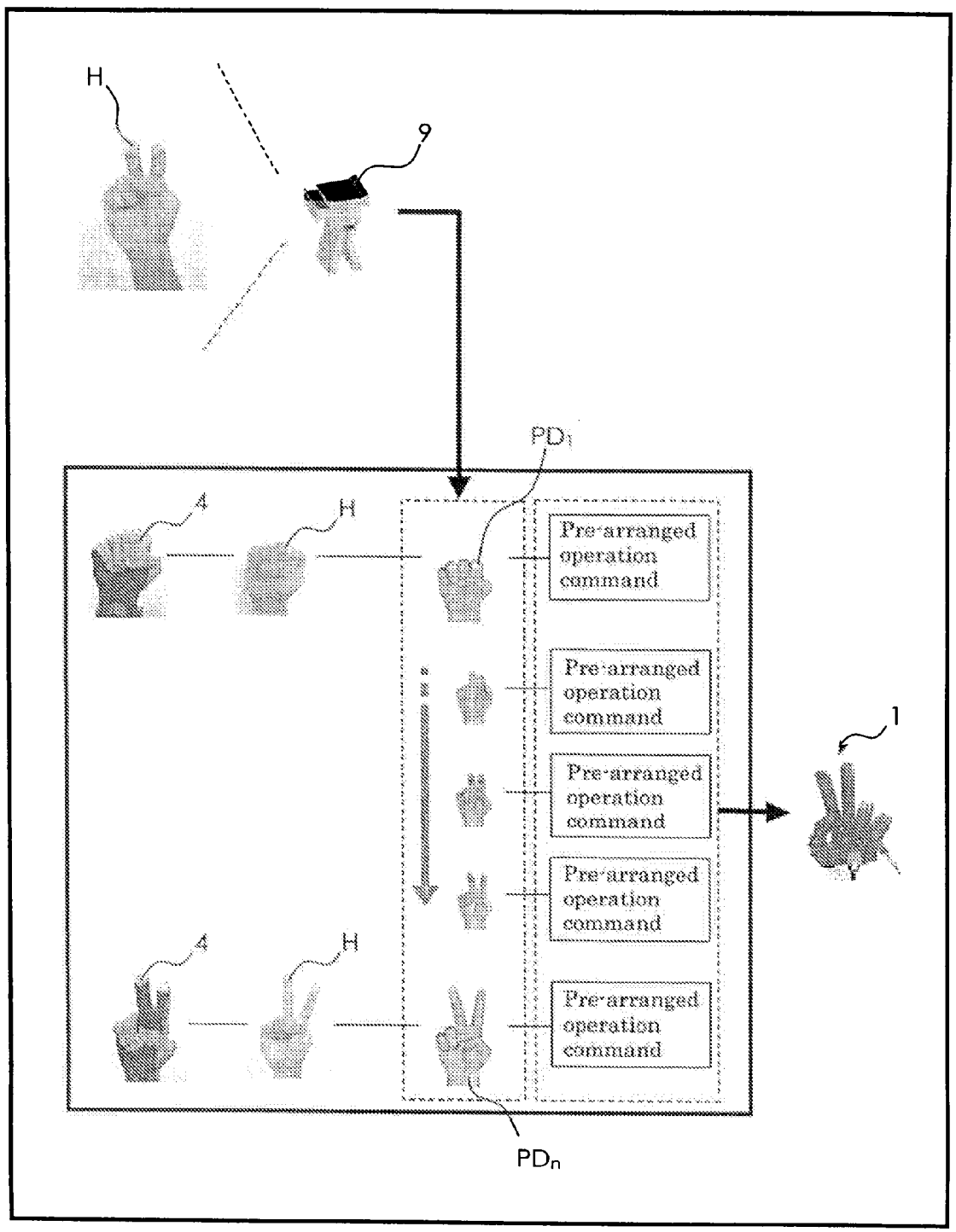
FIG. 9 is a diagram used for illustrating first to third steps.

In the second step, as shown in FIG. 9, using a camera 9 of double or single eye, the human hand H wearing the data glove 4 performs the same movement (a predetermined movement) as that performed for obtaining the pre-arranged operation commands. At this time, image data of the hand (moving object) H are obtained in time series. It should be noted that the image data may be obtained at the same time when the pre-arranged operation commands are obtained; or may be obtained later. In the example in FIG. 9, image data of the hand H when the hand H makes "stone" shape is taken, and based on the image data, using a computer graphics technology, imitation image data PD1 of an imitation of the hand are created. The image data of the hand H when the hand H makes "paper" shape is taken; and based on the image data, using a computer graphics technology, and imitation image data PDn of the imitation the hand are created. Images in the changing process from "stone" shape to "paper" shape may be actually taken, but as shown in FIG. 9, the images in that period may be created using a computer graphics technology. The imitation image data thus created are stored in an image data storing device 10.

In the third step, each of the image data, which are included in the plurality of image data obtained in the second step, are associated with or correspond to the pre-arranged operation commands stored in the pre-arranged operation command storing device 8, and stored in an image corresponding operation command storing means 11. It should be noted that, in this example, in addition to the actually taken images, in the case where image data between the one or preceding image data PD1 obtained in time series and the following or succeeding image data PDn, which are not taken yet, are created as the imitation image data with a computer graphics technology, the image corresponding operation command storing means 11 creates the pre-arranged operation commands corresponding to the imitation image data by estimating based on the pre-arranged operation commands corresponding to the one or preceding image data PD1 and the pre-arranged operation commands corresponding to the following or succeeding image data PDn, and stores the same while associating the same with the (untaken) imitation image data. By adapting as described above technique, many data, which are associated between the image data and the pre-arranged operation commands, can be obtained using a little actually-taken image data. Accordingly, the basic data (data associated between the image data and pre-arranged operation commands) can be collected or pre-arranged in an extremely simple manner.

The first to third steps are carried out as a preparatory operation for driving the robot hand. It should be noted that that, to achieve joint angle control with accuracy of 5° per degree of freedom in the driving of the robot hand, approximately 100 millions (7th power of 20) images are required. However, as described above technique, when the computer graphics technology is used, collection or pre-arranged of the basic data is simplified. As a CG editing software applicable to this case, the "Poser 5" (produced by Curious Labs Incorporated) is available. By using this software, from the joint data obtained from the output of the data glove, ideal finger CG images, which are similar to two-dimensional images of actually taken fingers can be generated in an interpolating manner. And the pre-arranged operation commands corresponding to the image data generated in an interpolating manner can be generated in a manner of linear interpolation of the joint angles. It should be noted that the file size of the finger CG per image is approximately 5 kB.

Figure 10:
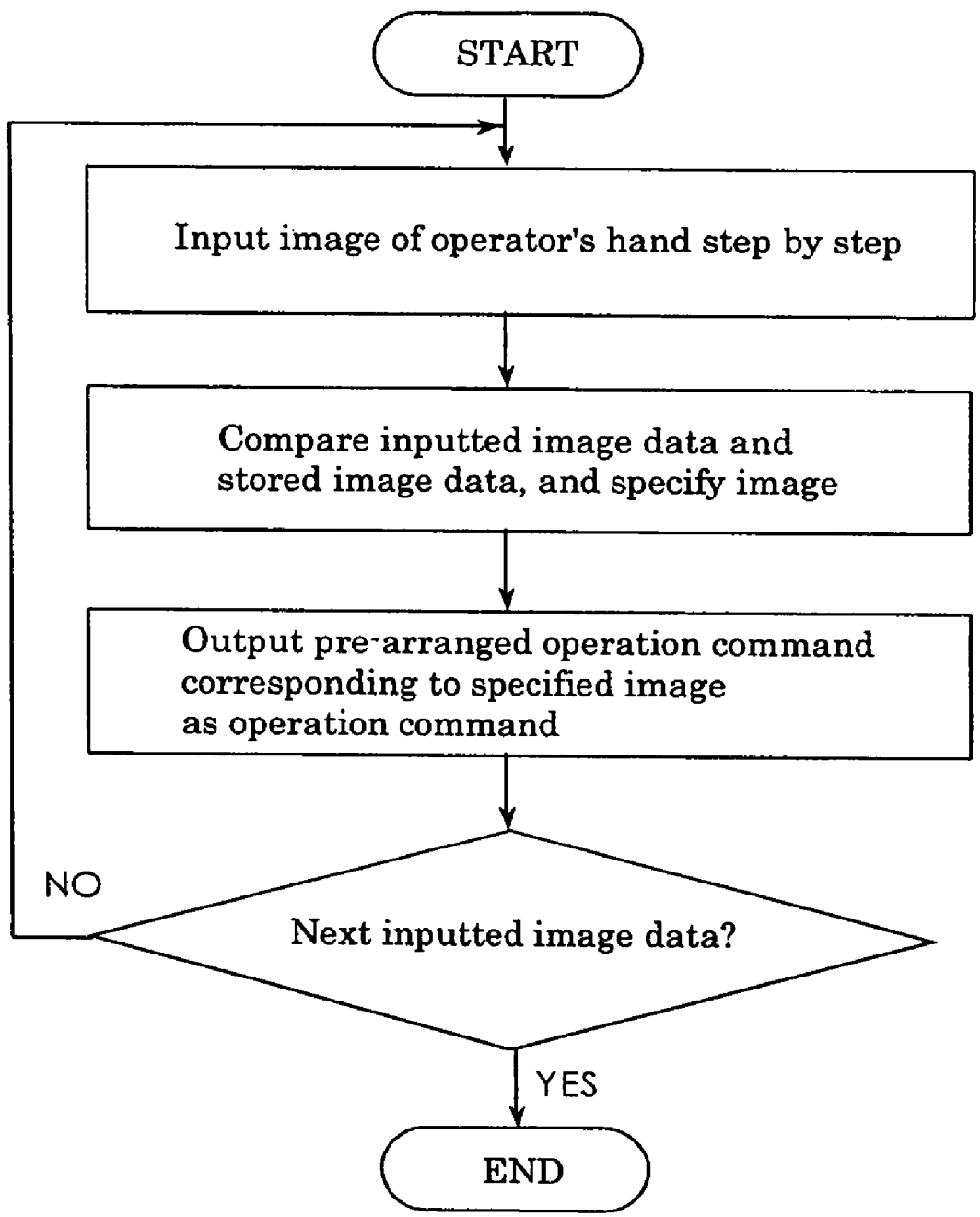
FIG. 10 is a flow chart showing an algorithm of software used for carrying out fourth and fifth steps using a computer.

The fourth and fifth steps are steps for actually driving the robot hand. In the fourth step, in order to operate the robot hand, a desired movement is carried out with a hand, and at the same time, image data of the hand are obtained in time series as the robot operational image data using a camera 12 as shown in FIG. 6. The robot operational image data (operational image data) are stored in a robot operational image data storing device 13. And in the fifth step, image data corresponding to the operational image data included in the robot operational image data are specified in time series from the plurality of image data stored in the image corresponding operation command storing means 11. The specifying operation is carried out in an image data specifying and operation command generating device 14. In this example, the relationship between the operational image data included in the robot operational image data and the plurality of image data stored in the image corresponding operation command storing means is determined based on the similarity therebetween. The determination of the similarity is made with an arbitrary method. And in the fifth step, pre-arranged operation commands corresponding to the specified image data are given to the driving device 3 as the operation commands, and the robot hand with multiple fingers is driven with the output from the driving device 3. The algorithm of the software for carrying out the principal parts in the fourth and fifth steps using a computer is as shown in FIG. 10.

As a technique for extracting feature quantity when specifying the image data in the image data specifying and operation command generating means 14, for example, a feature quantity extraction technique, which uses a higher order local autocorrelation function is available. As for the higher order local autocorrelation function, a detailed description is disclosed in a paper titled "Study on application of statistical method for flexible information processing": Electrotechnical Laboratory Research Report, J957 1993, pp. 126 to 140. For extracting feature in the 2-dimensional image of the fingers, the higher order local autocorrelation function was used. Assuming the objective image within an image be "f(r)", N-th autocorrelation function is defined as the following expression with respect to displacement directions (a1, a2, ... an).

$$x^N(a_1, a_2, \ldots a_N) = \int f(r)f(r+a_1) \ldots f(r+a_N) dr \qquad \text{[Expression 9]}$$

Figure 11:
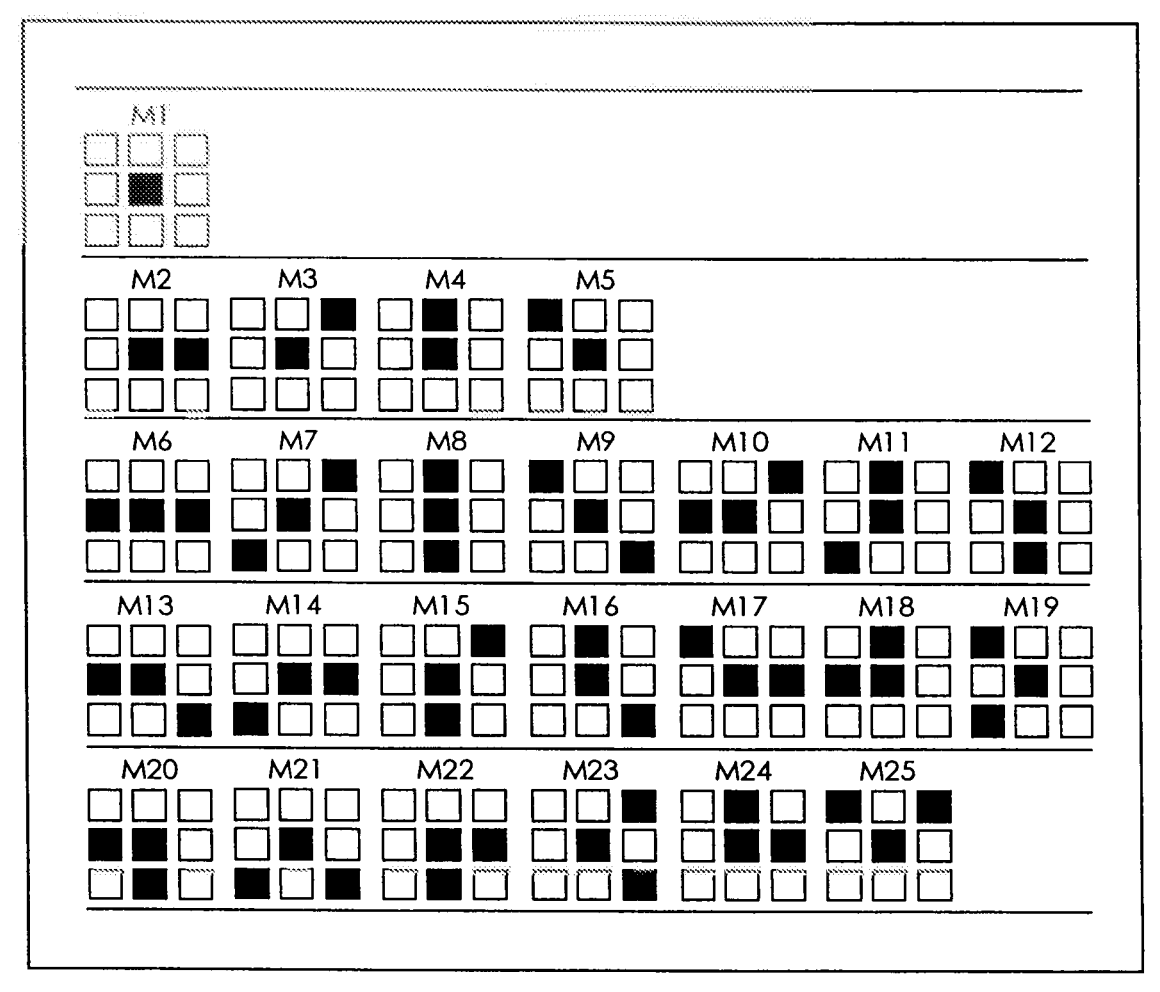

In the demonstration test, the order N of the higher order autocorrelation coefficient was 2, and the displacement direction was limited to an local area of 3 by 3 pixels vertically and laterally around a reference point "r". Owing to this arrangement, excluding equivalent feature due to parallel movement, the number of features "M" was 25 as shown in FIG. 11. Black squares in FIG. 11 correspond to the position of the pixels corresponding to the local pattern. The computing of the respective features is carried out by adding the product of the values of the pixels corresponding to the local pattern to the entire pixels.

According to the above method, in order to actually operating the robot hand 1, only by obtaining images of the hand corresponding to the robot hand 1, the robot hand can be caused to perform the same movement as the movement of the hand while eliminating ill-posed problem in a manner of imitation without using the sensors.

In the above embodiment, although the images of the human hand are actually taken in the third step, it is needless to say that every image data of the hand (image data of an imitation of the hand) may be generated with the computer graphics technology.

Next, a detailed description will be given as to an improving and enhancing technique of the above embodiment.

[Consideration on Individual Variation]

Figure 12:
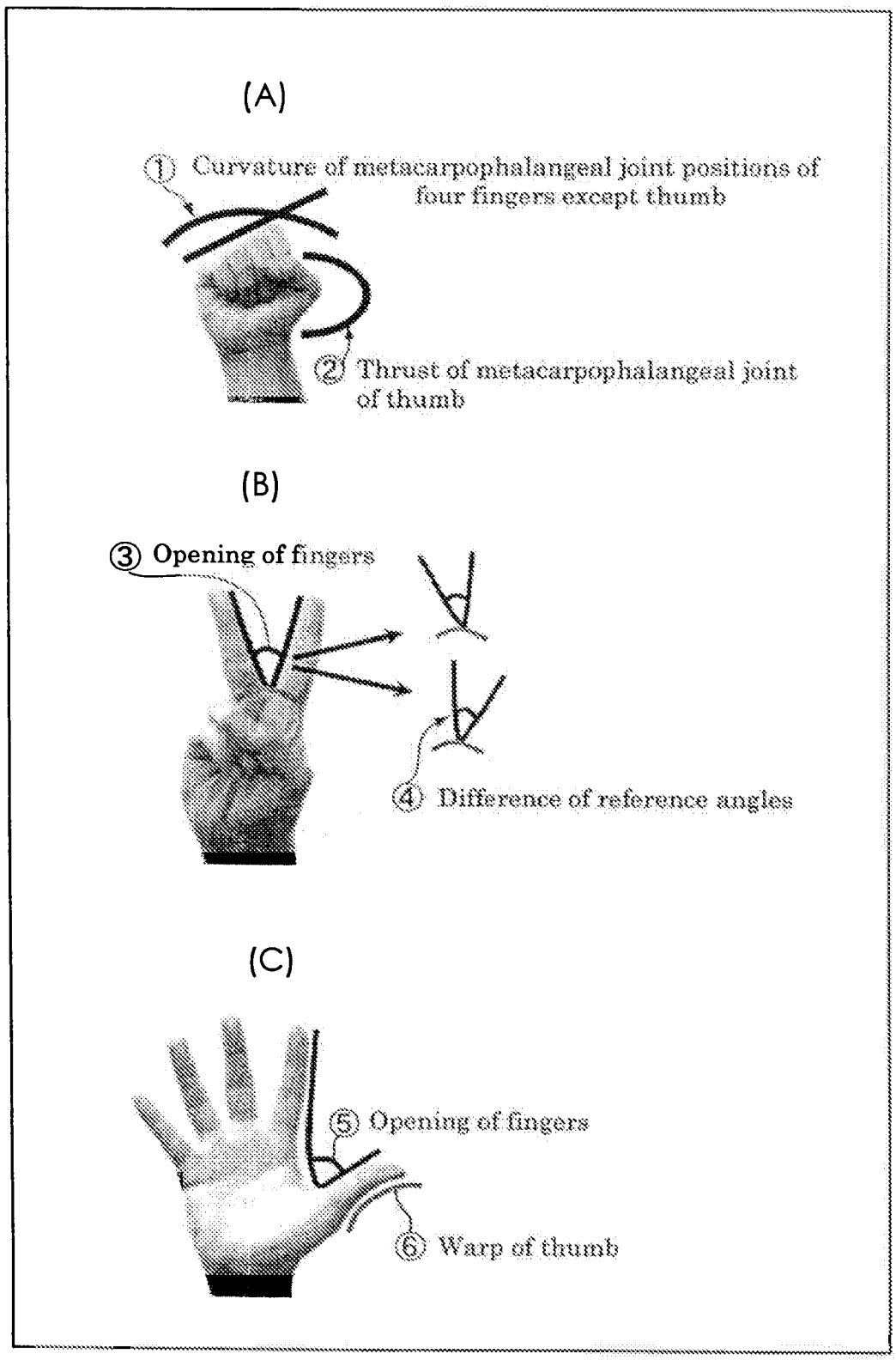
FIGS. 12(A) to 12(C) show difference elements in individual variations found in a human hand.
Figure 13:
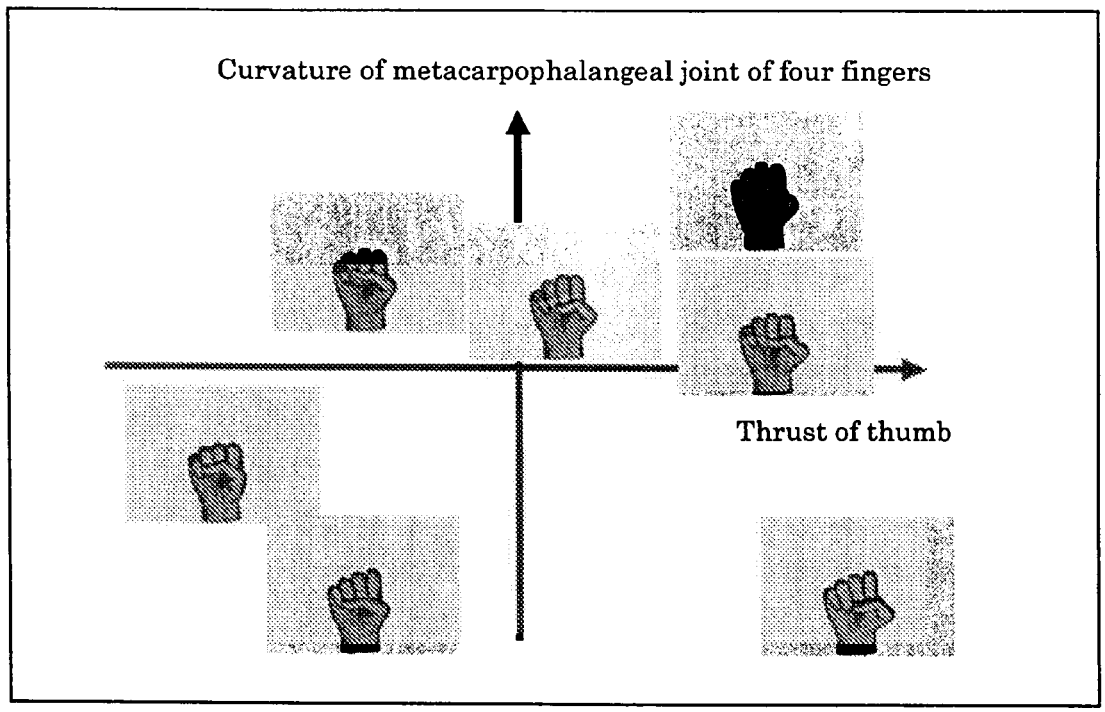
FIG. 13 is a diagram showing differences in image data when parameters for computer graphics software are changed to change curvature of metacarpophalangeal joint position and thrust of metacarpophalangeal joint of thumb.

First of all, in the above-described second step, by adding image data, in which individual variation found in human hand is taken into consideration, to the plurality of image data (including image data of the computer graphics), the specifying accuracy of the image data in the fifth step can be enhanced. FIGS. 12(A) to 12(C) show difference elements of individual variation found in human hand. FIG. 12(A) shows an image of a hand in which the hand is formed in "stone" shape. The individual variation appears in the warp of the metacarpophalangeal joint position of the four fingers excluding thumb. That is, in some hands, the metacarpophalangeal joint position of the four fingers forms a straight line; and some hands form a warped shape. Also, a considerable individual variation appears in the thrust of the metacarpophalangeal joint of thumb. Such individual variations are caused from the difference in length between two joints. FIG. 12(B) shows an image of the hand in which the hand is formed in a "scissors" shape. In this state, individual variation appears in the opened two fingers and the reference angle between the two opened fingers. Further, FIG. 12(C) shows an image of the hand in which the hand is formed in an opened "paper" shape. In this state, considerable individual variation appears in the opened state between thumb and forefinger, and state of warped thumb. When generating image data (imitation image data) of the hand shape using the computer graphics technology, such individual variations as described above can be readily obtained by changing the basic image data, which are already generated, as the parameter of difference elements. FIG. 13 is a diagram for illustrating differences in the image data when the warp of the metacarpophalangeal joint position and the thrust of the metacarpophalangeal joint of thumb are changed by changing parameters of the computer graphics software. Only when the two difference elements are changed, considerably different imitation image data of individual variations can be obtained. It should be noted that, it is needless to say that, when generating the image data, one or pre-arranged operation commands corresponding to the imitation image data, which is not created yet and will be newly created, are estimated and created based on pre-arranged operation commands corresponding to one or preceding image data and following pre-arranged operation commands corresponding to the following or succeeding image data; and the pre-arranged operation commands corresponding to the imitation data can be stored being associated with the imitation (not taken) image data.

[Change of Resolution]

Figure 14:
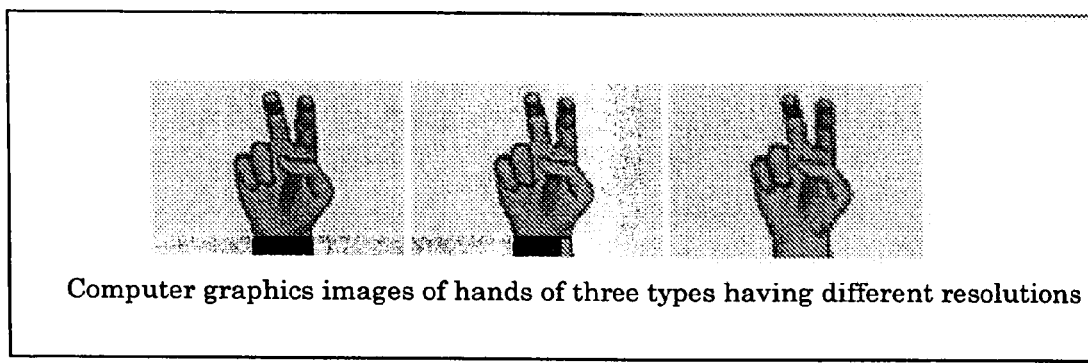
FIG. 14 is a view showing three kinds of image data in which resolution is changed.

In the plurality of image data created in the second step, a plurality of image data with different resolutions, which are created with changed resolution, may be included. The reason of this is why some image features appear remarkably when the resolution of the image data is changed. When basic image data are available, the resolution of the image data can be changed easily based on the basic image data. FIG. 14 shows three kinds of image data having different resolutions. The left side image is an original image; the center image is an image in a state that the resolution thereof is lowered by changing the vertical and lateral 2 by 2 pixels vertically and laterally into 1 pixel; and the right side image is an image in a state that the resolution thereof is lowered by changing the vertical and lateral 4 by 4 pixels vertically and laterally into 1 pixel. For example, in the case where 15,000 original images are available, by changing the resolution by two steps, 45,000 kinds of image data can be obtained. In a state that the hand is formed in a "stone" shape, since the fingers are overlapped with each other, the feature quantity can be comprehended more correctly with a higher resolution. However, in a state that the hand is formed in a "scissors" shape, the feature quantity of the image obtained from the portion of two upstanding fingers is important, but the feature quantity of the other portion may cause an incorrect determination. Therefore, when image data having different resolutions are previously prepared as basic data, accuracy of collation is enhanced.

[Calculation of Feature Quantity of the Respective Image Data]

In order to specify the image data, the use of the feature quantity extraction technique using the higher order local autocorrelation function has been described. In the conventional art, the feature quantities have been extracted with respect to the entire image. However, in order to enhance the accuracy, it is preferred to divide the image into several divided images and extract the feature quantities for the respective divided images. In order to achieve this, first of all, the center of gravity of the hand in the image data is estimated. For the purpose of this, image data of the computer graphics are binarized into a monochrome image, and with respect to the monochrome image, center is obtain in the X and Y axis directions respectively using the following expression.

$$x_g = \frac{1}{k}\sum_{i=1}^{160} x_{i*2}$$ [Expression 10]

$$y_g = \frac{1}{k}\sum_{i=1}^{120} y_{i*2}$$

In the above expression, "$x_g$" and "$y_g$" are X and Y-coordinates of the center of gravity; "$x_i$" and "$y_i$" are X and Y-coordinates of white pixel; and "k" is a number of the white pixels.

Figure 15:
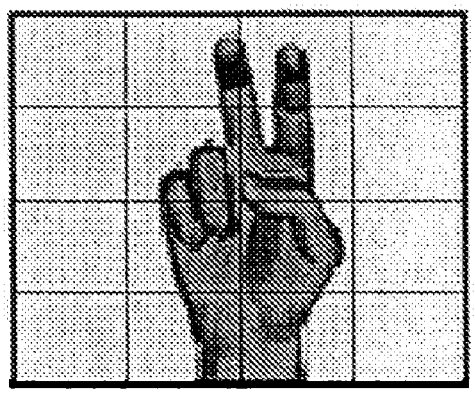
FIGS. 15(A) and 15(B) are views showing states in which one image constituted of 320 by 240 pixels vertically and laterally is divided into 4 by 4 areas of the image and divided into 8 by 8 areas of the image.
Figure 15:
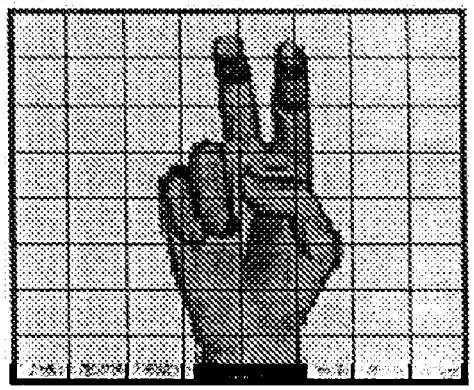

After obtaining the gravity center of the image as described above, each of the images is divided with reference to the gravity center. FIGS. 15(A) and 15(B) show a state that one image constituted of 320 by 240 pixels vertically and laterally is divided into 4 by 4 areas; and a state that the same is divided into 8 by 8 areas respectively. It should be noted that the image can be divided into 16 by 16 areas when the number of the pixels are 320 by 240 pixels vertically and laterally as described above.

The feature quantity is computed on each of the divided images, which are divided as described above. That is, the higher order local autocorrelation pattern is calculated with respect to each image division. In accordance with the method of obtaining the higher order local autocorrelation pattern, which has been previously described, the higher order local autocorrelation pattern is calculated on each of the image divisions. The following expression is a formula used for calculation of the higher order local autocorrelation pattern.

$$x^N(a_1, a_2, \ldots, a_N) = \int f(r)f(r+a_1)\ldots f(r+a_N)dr$$ [Expression 11]

In the above formula, "$x^N$" is a local correlation function around the N-th reference point r. Therefore, "N" is 2. (a1, a2, ... an) is the displacement direction in the N-th autocorrelation function; and "f(r)" is a brightness value at the pixel position "r" of the objective image in the image. When the local pattern shown in FIG. 12 is used, the number of patterns is 25; and if duplication is permitted, 35 patterns may be used.

[Reduction of Feature Quantity]

When the feature quantity is calculated as described above, if the number of the image data is too large, the value of feature quantities to be processed becomes too large accordingly. For example, the value of feature quantities when image data having tree resolutions as shown in FIG. 14 are used, feature quantity=3 resolutions×64 areas (image divisions) by 25 higher order local autocorrelation patterns=4800 (order). Therefore, it is preferred to reduce the feature quantity using the principal component analysis technique well known in the art. First of all, the factor loading of each principal component has to be calculated with the principal component analysis. The following expression is a formula for principal component score used in the principal component analysis.

$$z_{kp} = \sum_{l=1}^{div} \sum_{m=1}^{pnum} \sum_{n=1}^{25} a_{klmn} x_{plmn}$$ [Expression 12]

In the above expression, "$Z_{kp}$" is the principal component score of data p in a k-th principal component; "$x_{plmn}$" is the n-th feature quantity in an m-th area of the image of a first resolution ("l" is a small character of an alphabet "L") of data p; "$a_{klmn}$" is the factor loading of the n-th feature quantity of the m-th area of the image of a first resolution in k-th principal component; "div" is a number of resolutions (for example, 3); and "pnum" is a number of areas of the image divisions) (for example, 8 by 8 areas).

Here, by calculating the factor loading $a_{klmn}$ and substituting the same into the above expression, principal component score of data "p" in the k-the principal component can be obtained. As the calculating the method of the factor loading "$a_{klmn}$", the method of principal factor, method of least squares, the method of maximum likelihood or the like are available. When calculating the factor loading using the method of principal factor, the following steps are applied.

(1) standardize the variance of variables to 1, and calculate sample correlation matrix $C=(r_{jk})$.

(2) substitute maximum value "$r_{max}(j)$" (j!=k) in the correlation coefficients between "$x_j$" and the rest variables into diagonal element of "C" to create "C*".

(3) figure out the eigen value problem of the "C*" to obtain eigen values $\lambda_1, \lambda_2, \ldots, \lambda_p$ and corresponding eigen vectors $c_1, c_2, \ldots, c_p$. The eigen vectors are the factor loading.

Then, to reduce the feature quantity, calculate the contribution ratio of the principal component. Here, the wording "contribution ratio" means a coefficient representing how much the principal components describe the original information, and is expressed as below.

$$C_k = \sum_{l=1}^{div} \sum_{m=1}^{pnum} \sum_{n=1}^{25} b_{klmn}^2 / (div * pnum * 25)$$ [Expression 13]

Here, "$C_k$" is the contribution ratio of the k-th principal component; and "$b_{klmn}$" is the correlation coefficient between the principal component score "$Z_{kp}$" and "$x_{plmn}$", and is defined by the following expression.

$$b_{klmn} = a_{klmn}\sqrt{\lambda_k}$$ [Expression 14]

The "$a_{klmn}$" is the factor loading of the n-th feature quantity in the m-th area of the image of the first resolution of the k-th principal component; and "$\lambda_k$" is the eigen value of the k-th larger correlation matrix.

Then, the number of the principal component is determined based on the cumulative contribution ratio. The above contribution ratio "$C_k$" is a coefficient representing how much each principal component describes the original information; and the following relational expression can be established.

$$C_1 \geq C_2 \geq C_3 \geq \ldots \geq C_k \geq C_{k+1} \geq \ldots \geq C_{div*pnum*25}$$ [Expression 15]

With a target cumulative contribution ratio of about 95%, the number of principal components used in the reduction of feature quantity is determined using the following expression.

$$\sum_{k=1}^{div*pnum*25} C_k \geq 0.95$$ [Expression 16]

In this embodiment, principal components up to the 10-th principal component of which cumulative contribution ratio is approximately 97% are used.

Then, the data are rearranged in accordance with the principal component scores. The entire data are rearranged (sorted) in accordance with the size of the principal component score on the principal component basis from the first to the 10-th principal components. Owing to this rearrangement, 10 kinds of image data sources are created. FIG. 16 shows rearranged images. Assuming that the number of original images 15,000, owing to this rearrangement, total 15,000× 10=150,000 image data are stored.

In order to search similar images efficiently when an image of unknown human fingers is inputted, it is preferred to predetermine the number of objects to be searched while limiting the range. In particular, the data identical to the unknown image or the data having the closest principal component score "$Z_{kp}$" in the principal components and the data preceding/succeeding the data having a number corresponding to the proportion of the principal components are the object to be researched. The number of candidates of the principal components is as below.

$$dc_p = Cc * \frac{\lambda_p}{\sum_{i=1}^{10} \lambda_i}$$ [Expression 17]

Here, "$dc_p$" is an estimation candidate number of the p-th principal component (p=1, 2, … 10).

"Cc" is a sum of estimation candidate numbers, which is predetermined.

And the fractional expression including "$\lambda p$" is the contribution ratio of "p" component in the 10-the principal component.

Owing to the above expression, the preceding/succeeding data of the number corresponding to the contribution ratio of the principal components are determined as the objects to be searched. For example, referring to FIG. 16, assuming that the principal component score "$Z_{kp}$" of the first principal component in the operational image data as the object to be collated be 13; image data having the estimation candidate number are extracted as the image data for collation including the image data of which principal component score is close to 13 at the center in the image data, which are the base for rearrangement in the order of score of the principal component score in the first principal component.

Figure 17:
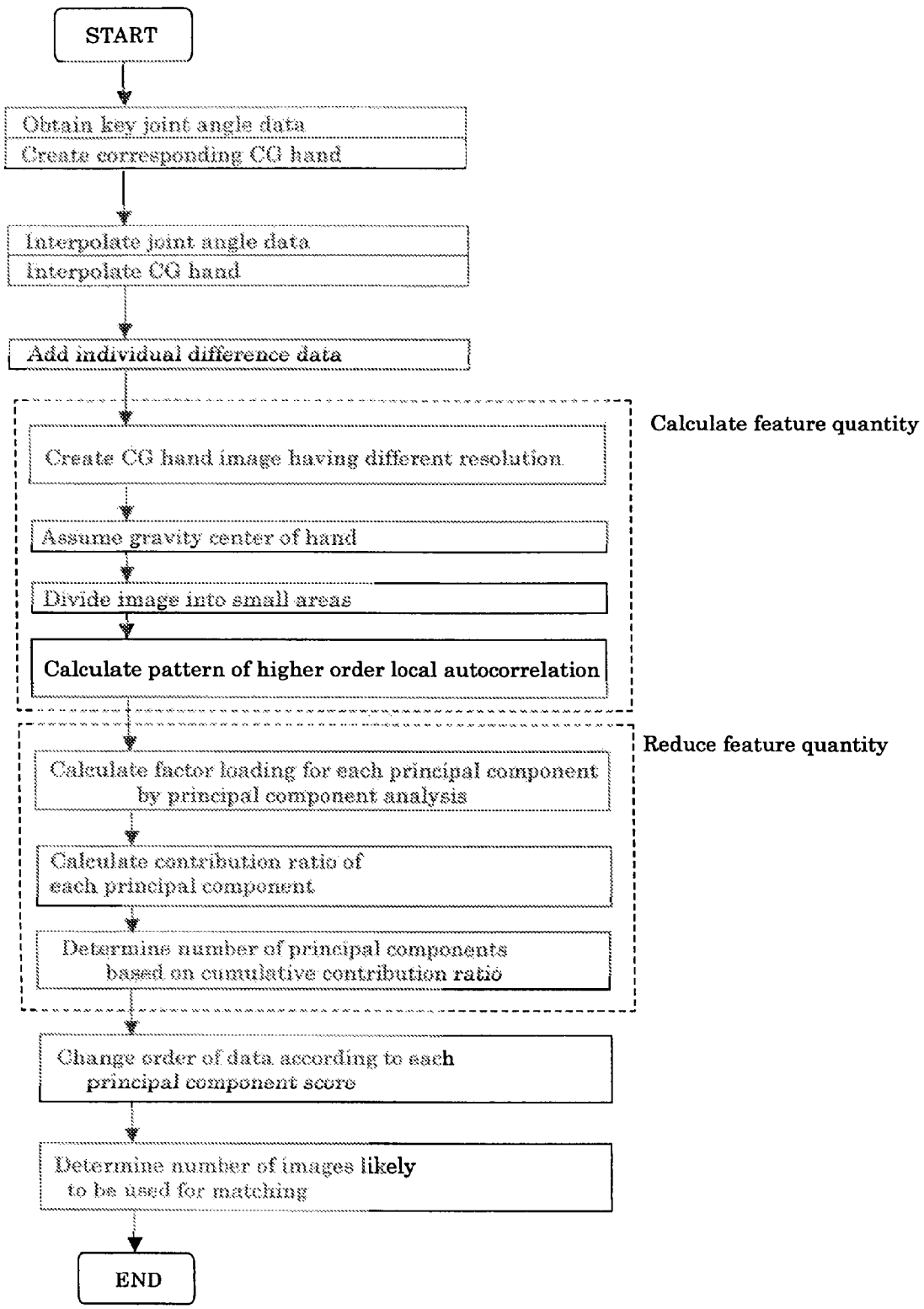
FIG. 17 is a flow chart showing a sequence of generation of database of image data.

FIG. 17 shows the sequence of creating the database of the image data including the above-described improvements (equivalent to the first to third steps of the embodiment).

Figure 18:
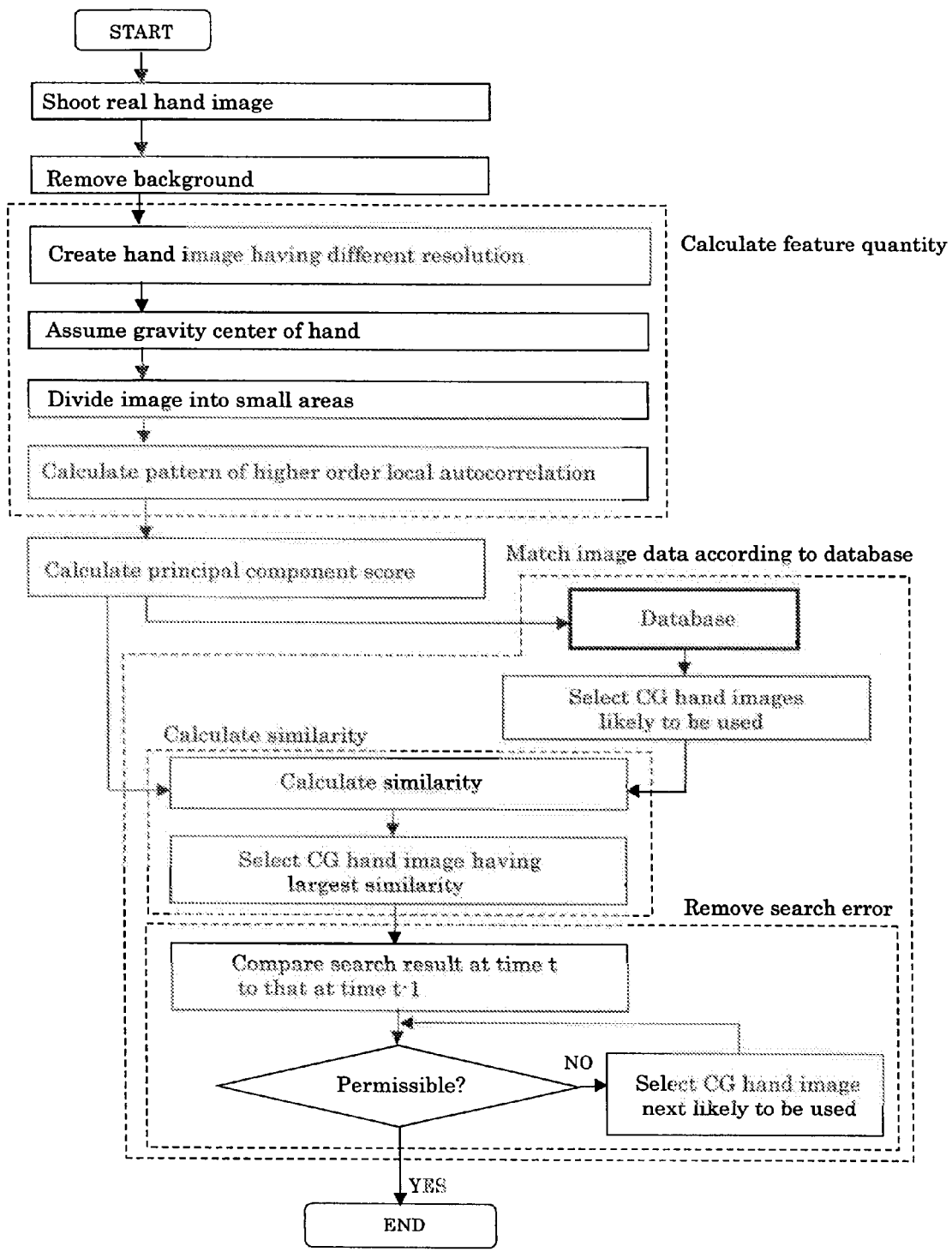
FIG. 18 is a flow chart showing a flow of a matching step.

Next, the processing steps to process the fourth and fifth steps (collation process) of the present invention using the principal component analysis technique utilizing the data base, which are created as described above, will be described. FIG. 18 shows the flow of a particular collation step. First of all, real hand image is shot or taken. When the above-described reducing technique of feature quantity is used, since a processing speed faster than video rate can be obtained, a high speed camera may be use for shooting. Background is removed from the shot image to remove unnecessary information. Therefore, a process to delete (background image) from the shot image (hand image+background image) is carried out.

Then, the feature quantity of the shot image (operational image data) is calculated. The feature quantity may be calculated with the resolution at the shooting. In the example in FIG. 18, the resolution of the taken operational image data is changed, and operational image data having three different resolutions (plural kinds) are obtained. That is, in simple words, 3 times data are created with respect to the identical operational image data. And, with respect to the three kinds operational image data (data of hand image) in which the resolutions are changed, the center of gravity of the hand image is estimated in the same manner as the above-described creation of the database to divide the image. In this case also, the image is divided into 16, 64 or 246 areas. The number of division is arbitrary. However, it has been verified that even when the number of division is increased too largely, the accuracy is not increased. Therefore, as for the number of divisions, 16 or 64 or so is preferred.

Then, the higher order local autocorrelation pattern of each divided image is calculated. The calculation method of the higher order local autocorrelation pattern is also the same as the above-described calculating method of the higher order local autocorrelation pattern used when creating the database.

Then, the principal component score is calculated using principal component analysis based on the calculated higher order local autocorrelation pattern. The calculation of the principal component score also employs the same calculating method as the above-described calculating method of the principal component score when creating the database.

Then, the image data which has been shot is matched with the plurality of the image data. A plurality of image data for matching, which are the candidates for matching, are selected among the database with reference to the principal component score obtained by the calculation. It should be noted that the number of the candidates among the respective principal components is predetermined using the above described [Expression 17]. Therefore, image data having a closest principal component score "$Z_{kp}$" in the respective principal components and the image data preceding and succeeding the image data are selected for the number of predetermined candidates corresponding to the contribution ratio of the respective principal components as the image data for matching. The image data of the number of the previously determined candidates are selected from 10 kinds of image data sources, which are rearranged with reference to the 10 kinds of principal components stored in the database. Assuming that the number of the candidates be previously determined as 20 with respect to each principal component, image data of 20×10=200 are selected from the database. Needless to say that some of the image data overlap with each other.

Then, the similarity is calculated. In particular, between an inputted image (operational image data) and a plurality of candidate image data (candidate CG band images) for matching, Euclidean distance "Er" is calculated using the following expression.

$$E_r = \sum_{i=1}^{10} (f_i(x_r) - f_i(x_t))^2 \quad \text{[Expression 18]}$$

Here, "fi(x)" is the principal component score of the i-th principal component calculated from the feature quantity;

"$x_r$" is the feature quantity obtained with the higher order local autocorrelation function of a candidate "r";

"$x_t$" is the feature quantity obtained with the higher order local autocorrelation function at a time "t";

a data "p", which makes the minimum "Er", is the searching image; and the joint angle data included in the data "p" is the estimation angle.

When the search results of time "t" and time "t−1" are within allowable range of the joint angle, the search with respect to the time "t" is terminated. And when a joint angle, which is largely different from the time "t−1", is selected, the next candidate, which has the smallest Euclidean distance "Er" next to the above is selected, and calculation is made to check if the same is within the allowable range using the following expression.

$$A_p = \sum_{i=1}^{24} (ang_{i(t)} - ang_{i(t-1)})^2 \quad \text{[Expression 19]}$$

Here, "$A_p$" is the allowable value; and "i" is a joint number of the data glove (in this example, i=24).

Also, "$ang_{i(t)}$" is the i-th joint angle data at a time "t".

When the allowable value is within the allowable range, the image data are determined as the data corresponding to the operational image data.

Figure 19:
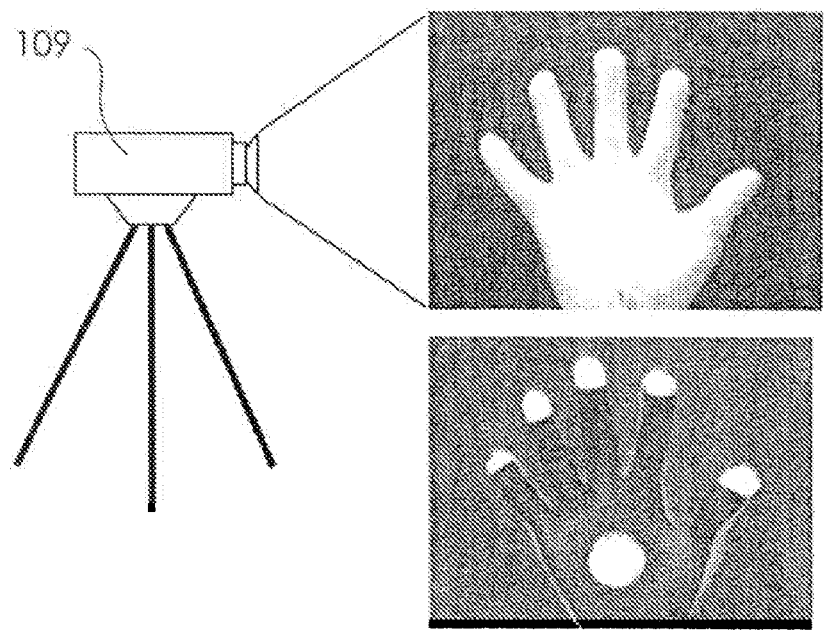
FIG. 19 is a schematic view used for illustrating another embodiment of the method of the present invention.
Figure 20:
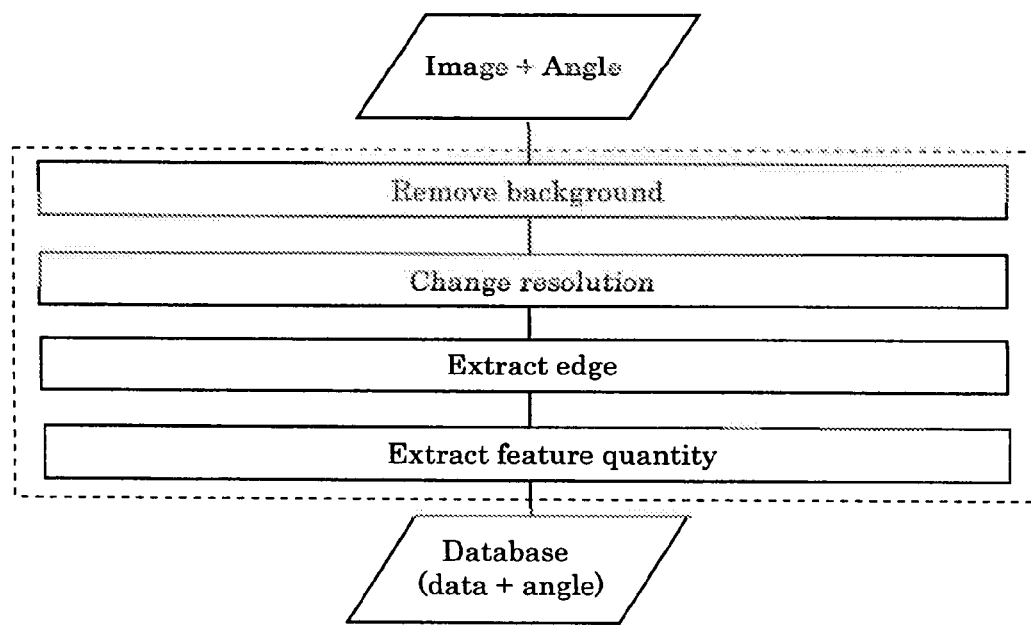
FIG. 20 is a flow chart showing an algorithm for generating a database.
Figure 21:
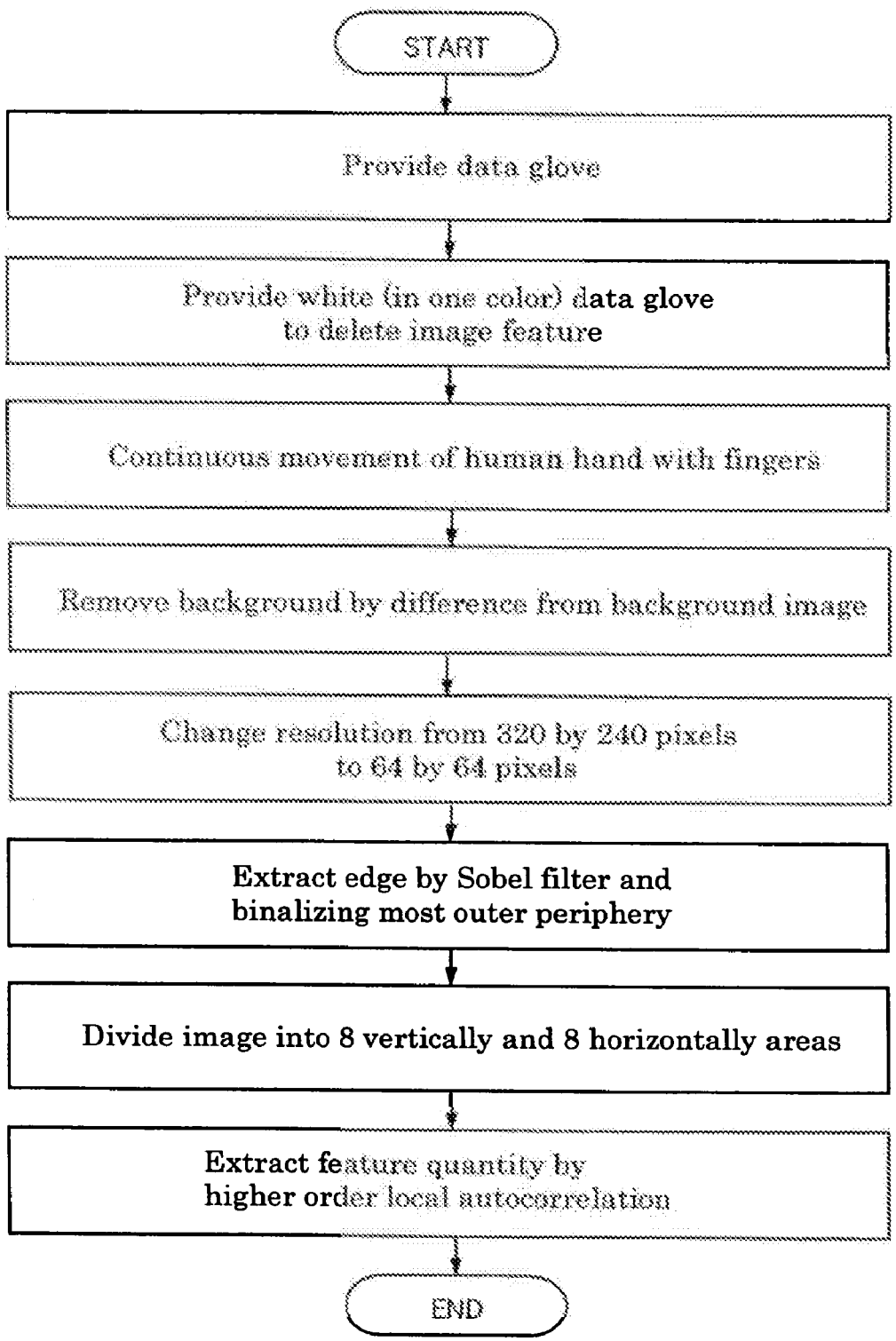
FIG. 21 is a flow chart showing a detailed algorithm in FIG. 20.

Next, another embodiment of the method in accordance with the present invention will be described. Different from the above-described embodiment, in this embodiment, on a hand wearing the data glove, a glove (cover) of a solid or plain color (non-pattern: monochrome) is further put on as shown in FIG. 19, and the above first and second steps are carried out simultaneously. In FIG. 19, the lower figure shows the hand wearing the data glove; and the upper figure shows the hand wearing the data glove on which another glove is put on. FIG. 20 is a flow chart showing a sequence when creating data base previously; and FIG. 21 is a flow chart picture plane showing detailed flow chart of FIG. 20.

First of all, the hand in a state wearing the glove is shot with a video camera 109. In this embodiment, the data base is built using image data of the hand shot with the high speed video camera 109 and joint angle data obtained from the data glove. Therefore, the image data and the joint angle data are obtained as a set. In this embodiment, the hand with the fingers is shot with a monochrome high speed camera (ES310/T manufactured by MEGAPLUS) at the resolution of 320 by 240 pixels vertically and laterally, and it is estimated such a state that the fingers are taken with a satisfactory size within an image. And for measuring the joint angle data, a data glove named "CyberGlove" (trade mark) manufactured by the Virtual Technologies was used. And as for the another glove, a white-monochrome glove with no pattern was used. By putting the another glove on the data glove, image features inherent to the data glove (shapes of sensor and the white glove) are prevented from being exhibited. Different from the previous embodiment, the shot of the white glove is different in color and image itself from those of human hand. However, even the image data of the hand wearing the white glove, by converting into feature quantity, the image data can be handled as a hand image data of the hand as will be described later. When creating the data base, to avoid the influence due to the background image, the shoot is carried out using a monochrome and no-pattern screen as the background. And primary data base is built using the finger joint angle data obtained from the data glove and with a plurality of continuous image data is so that one joint angle data and are image data becomes a set. In order to obtain necessary and enough information, necessary image data and angle data are obtained simultaneously while moving the hand continuously and saved.

In this embodiment, an image processing is carried out to convert image data of the primary data base into feature quantities necessary for assuming the actually shot hand image. For the purpose of the image processing, background removal, resolution change, edge extraction, and contour extraction (feature quantity extraction) are carried out.

First of all, background is removed from the image information. Using a previously obtained background image, difference from the object image is obtained. When the difference exceeds a threshold value, the pixel of the object image is used, if not so, 0 is set.

Then, the resolution of the image from which the background has been removed is changed. The obtained image has the size of 320 by 240 pixels vertically and laterally. However, when using the image as it is, it takes too much time for computing for carrying out the assuming process while performing various image processing. Also, in the case where the estimation is made by a human, even when the size of an image is a smaller than that used in this embodiment, the estimation is possible. Therefore, in this embodiment, the resolution is changed from the size of 320 by 240 pixels vertically and laterally to a size of 64 by 64 pixels vertically and laterally. The pixel value after the resolution change is denoted with the following expression.

$$gr(i, j) = \frac{1}{r}\sum_k \sum_l go\left(\frac{i*320}{64} + \frac{k, j*320}{64} + l\right) \quad \text{[Expression 20]}$$

Here, "gr(i, j)" is the pixel values at the i-the row and j-the column after the resolution change. "go(i, j)" is the pixel values at the i-th row and j-the column before the resolution change. In this expression, calculation is made with 320 pixels vertically aiming for matching aspect ratio because pixel value after changing resolution is made into 64 by 64. Also, as for "k, l", the calculation is made from i×320/64 to (i+1)×320/64−1; and "r" is the number of k×l.

Using the resolution modified images, which has been obtained in the above operation, the edge extraction is carried out. Here, features necessary for the estimation are extracted. In particular, changed images are filtered with a Sobel filter. After that, by binarizing the outermost periphery of the images, the edge thereof is extracted.

The process with the Sobel filter is expressed by the following expression.

$$fs(i, j) = \begin{cases} 127(fr(i, j) > 70) \\ 0(fr(i, j) \le 70) \end{cases} \quad \text{[Expression 21]}$$

Here, the "fr(i, j)" is expressed by the following expression.

$$fr(i, j) = \sqrt{\begin{cases} -2*fi(i, j-1) - fi(i+1, j-1) - \\ fi(i-1, j-1) + 2*fi(i, j+1) + \\ fi(i+1, j+1) + fi(i-1, j+1) \end{cases}^2 + \begin{cases} -2*fi(i-1, j) - fi(i-1, j+1) - \\ fi(i-1, j-1) + 2*fi(i+1, j) + \\ fi(i+1, j+1) + fi(i+1, j-1) \end{cases}^2} \quad \text{[Expression 22]}$$

In the above expression, "fi(i, j)" represents a pixel at the i-th in lateral and the j-the in vertical before the processing. The "fs" is the final value after processing.

Figure 22:
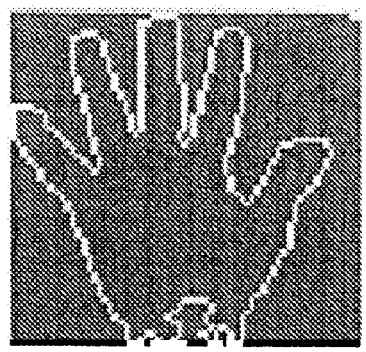
FIG. 22 is a view showing an image data of contour extraction.

Here, the binarization of the outermost periphery of the image is carried out using a relatively low threshold value so as not to generate discontinuity in the contour due to the contour extraction. As the final image processing, scanning is carried out on the binarized image obtained by the edge extraction to extract its contour. The image obtained by in previous step is not used as the contour because of changes in environment light. Differences are found in the environment light, human skin color or the like between at the point of real estimation and at the point of creation of the database. Moreover, even when edge extraction is carried out, at the point of creating the database, since the white glove is used, value and width or the like of the edge are different from those of the edge in real image. As a result, when the image data of the database and real image data are compared (when estimated), a large difference may be generated between the both edges. Therefore, by carrying out the contour extraction, the width and value of the edge are made uniform. In order to reduce the difference between the information obtained from the database and the information obtained by estimation and to eliminate the influence from the environment, the contour extraction is employed; and thus, error is reduced at the estimation. FIG. 22 shows an image after resolution change obtained by carrying out contour extraction after edge extraction.

It should be noted that in the contour extraction algorithm for binarizing the outermost periphery only, scanning of image is made from the top and a point of first 127 is the start point. Adjacent pixels are searched counterclockwise from the start point, and when a point of 127 is found, the processing shifts to the point of 127, and the value is changed to 255. After shifting, with reference to the previous position, the search start point is divided into eight patterns and the search is continued. At a point when the processing returns to the start point again, it is determined that the contour has been extracted and the search is terminated. Finally, as for the rest points, since the points are not the contour, points of 127 are all set to 0.

Then, the image data after contour extraction are converted into feature quantity. In this embodiment, a higher order local autocorrelation function proposed by Otsu et al. (N. Otsu and T. Kurita, "A new scheme for practical, flexible and intelligent vision systems, "Proc. IAPR. Workshop on Computer vision, pp. 431-435, 1998) is used to obtain the feature quantity. Higher order local autocorrelation function is effective features for recognizing and measuring images. Using a high order correlational function defined by the following expression, the reference points and the vicinity thereof are calculated.

$$x^N(a_1, a_2, \ldots, a_N) = \int f(r)f(r+a_1)\ldots f(r+a_N)dr \quad \text{[Expression 23]}$$

Figure 23:
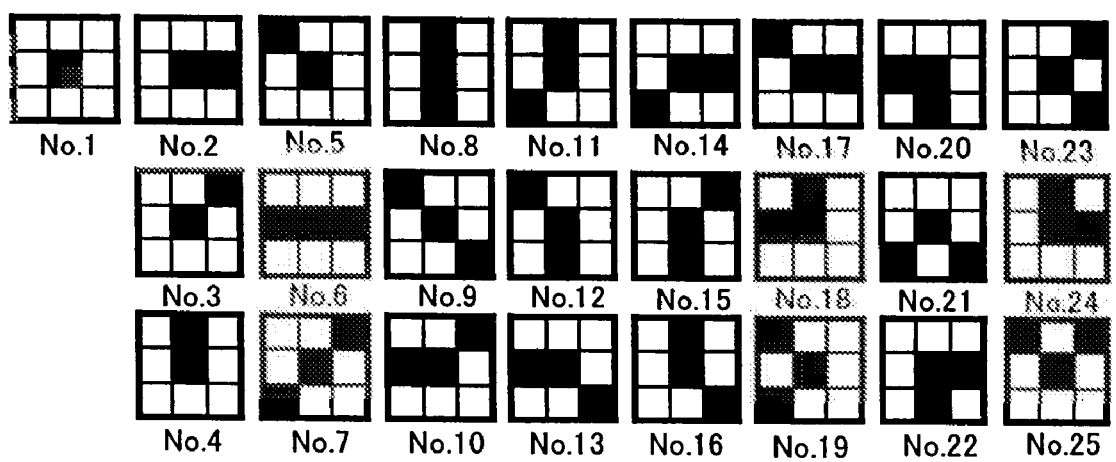
FIG. 23 is a diagram showing an example of local patterns for higher order local autocorrelation function used for generating a database.

In the above expression, "$x^N$" is a correlational function in the vicinity of a point "r" in N-th dimension. Generally, when processing a real image, since factor object point are important, coefficient N is limited up to 2nd order or less. Also, excluding it is possibly expressed with equivalent terms due to parallel translation, the points are expressed with 25 kinds of feature quantities as shown in FIG. 23. It should be noted that, compared with the feature quantities from No. 6, since the feature quantities from No. 1 to No. 5 are small in scale, the scale thereof has to be made uniform with each other. The feature quantities from No. 1 to No. 5 are further multiplied by the pixel of the reference point; the feature quantity of No. 1 is multiplied by square of the pixel value of the reference point to make the scale uniform with the scale of other feature quantities.

Figure 24:
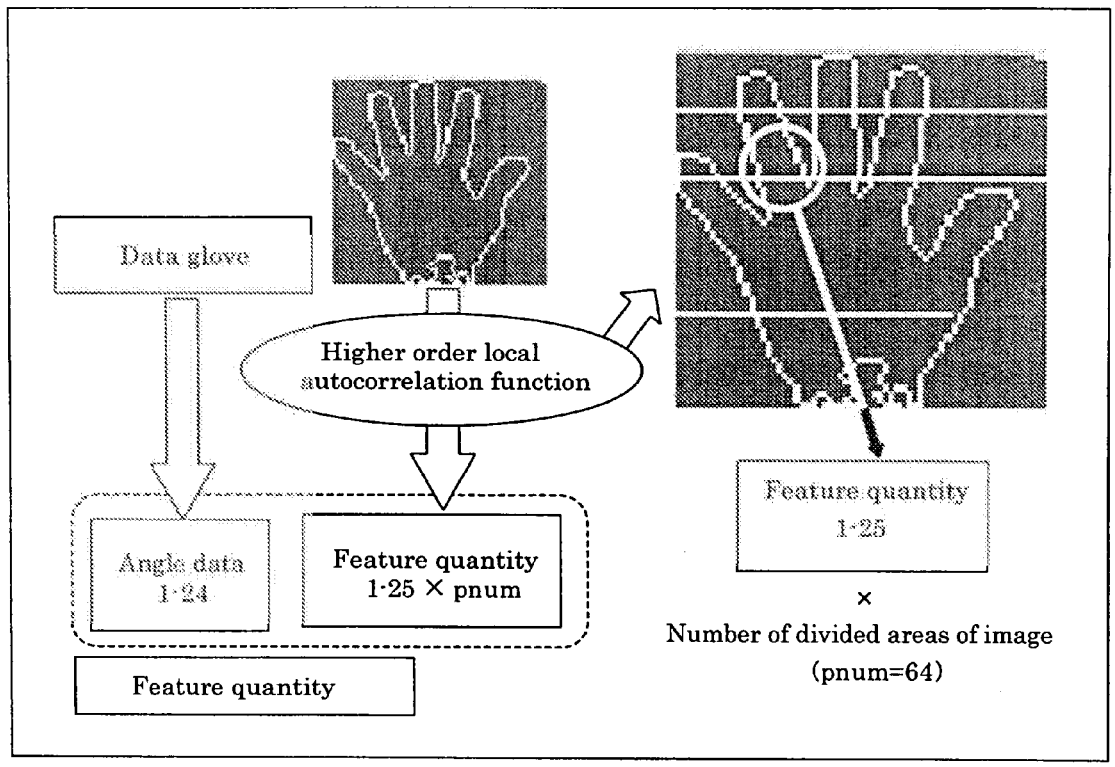
FIG. 24 is a diagram used for illustrating the extraction of feature quantities

In this embodiment, as shown in FIG. 24, an image is divided into 8 by 8 vertically and laterally. And, in the total 64 divided areas, with respect to each of the pixels as the reference point, the 25 kinds of feature quantities are reduced using the higher order local autocorrelation function. That is, from the viewpoint of entire image, the feature quantity of the entire image can be obtained using the feature quantities of 25 patterns×number of divided areas.

The feature data of image data converted into feature quantity and an angle data obtained from the data glove (corresponding to pre-arranged operation command) are stored in an image corresponding operation command storing means (data base) as a set. In this embodiment, actually real image is specified using this database.

Figure 25:
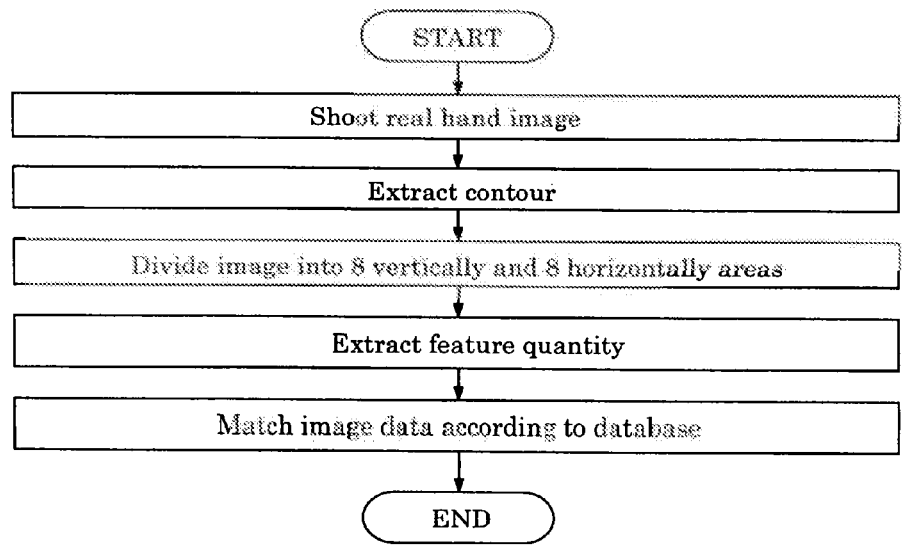
FIG. 25 is a flow chart showing an algorithm for selecting image data corresponding to an operational image data from image data stored in the database.
Figure 26:
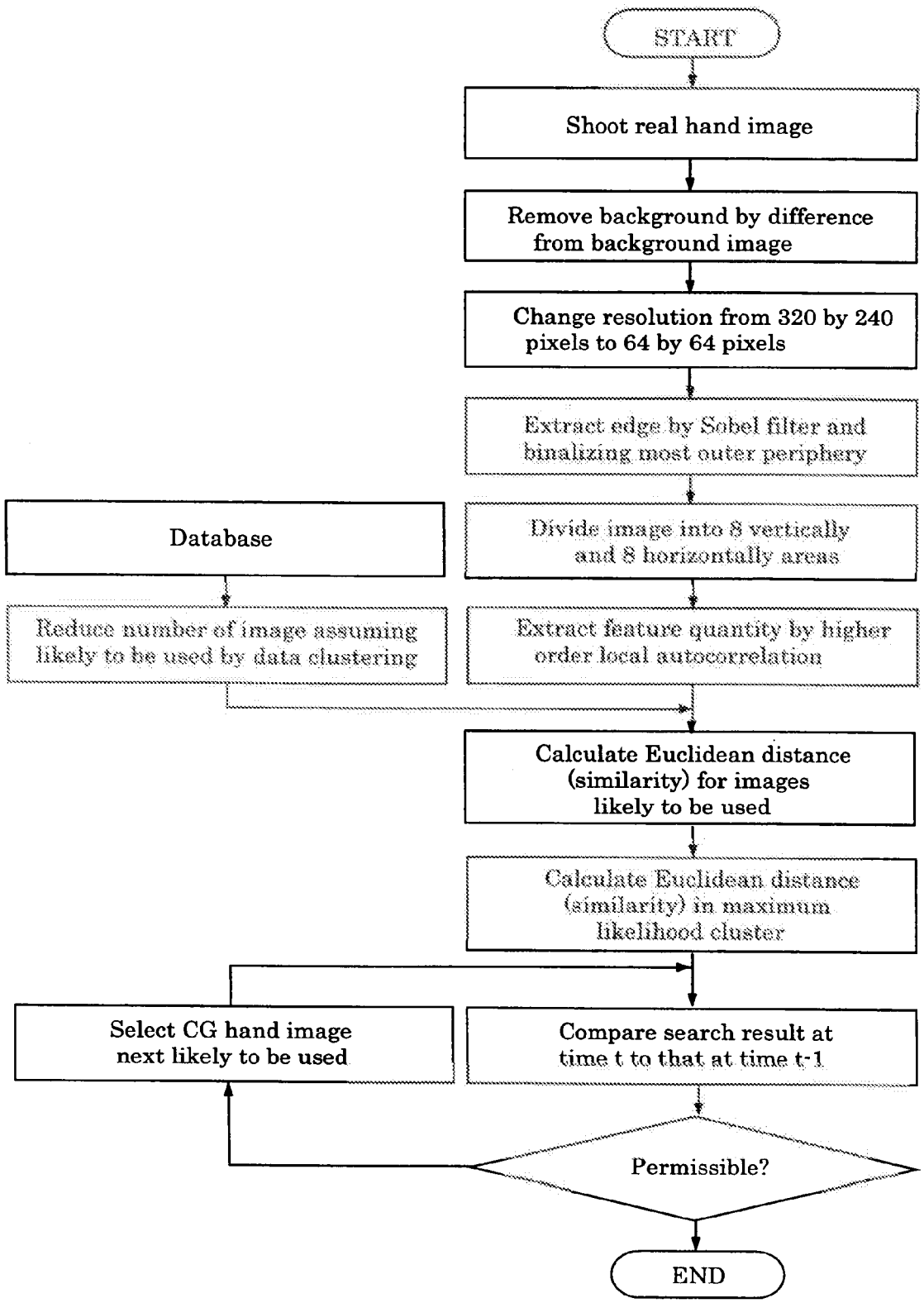
FIG. 26 is a flow chart showing the detailed algorithm in FIG. 25.

Then, a method to estimate the finger angle from a real image of an actually shot hand using a database (image corresponding operation command storing means), which is generated as described above, will be described. FIG. 25 is an algorithm showing a sequence of estimation; and FIG. 26 is a detailed algorithm thereof. First of all, before carrying out the estimation, images (operational image data) of a moving hand are obtained with a high-speed camera in the same manner as the case of database creation. And the same image processing as the case of database creation is made on obtained operational image data to extract feature quantity. And the feature quantities of the operational image data is compared to the feature quantity of a plurality of image data stored in the database in the process, which will be described later, and angle data to be associated with the image data closest to the operational image data is outputted as the operation command corresponding to the operational image data thereof.

In particular, in the process of matching with the database, the distance between the feature quantity of the operational image data and every image data stored in the database was calculated. The calculation of the distance was carried out using a simple Euclid distance. Final distance was calculated using the following expression.

$$E_r = \sum_{i=1}^{25*n} (x_{ri} - x_{ti})^2 \quad \text{[Expression 24]}$$

In the above expression, "$x_{ri}$" is a feature quantity "i" with the higher order local autocorrelation function of class r; "$x_{ti}$" is the feature quantity "i" at a time "t" with the higher order local autocorrelation function. The angle of the data "r", which minimizes the "Er", is estimated as the angle of the operational image data. However, since data having a similar feature quantity may sometimes creep into those with largely different angles, the angle is confined by using the estimated angle at the previous time (at a time of t−1). In particular, as for the data of which distance is close, when the assessment function "Ap" expressed by the following expression exceeds a predetermined value, the data was excluded from the estimation candidate. When the assessment function "Ap" is within the predetermined value, the estimation angle is adopted.

$$A_p = \sum_{i=1}^{24} (ang_{i(t)} - ang_{i(t-1)})^2 \quad \text{[Expression 25]}$$

Here, "$ang_{i(t)}$" is the i-th angle data at a time "t". Also, the angle information obtained from the data glove is 24. Present estimation angle is obtained with the above-described steps.

In an real estimation, when the process of the distance calculation is carried out on every image data stored in the database, since the calculation cost becomes too large depending on the size of the database, real time processing is impossible. Therefore, in this embodiment, the number of estimation candidates is reduced by clustering the data to achieve real time processing.

Figure 27:
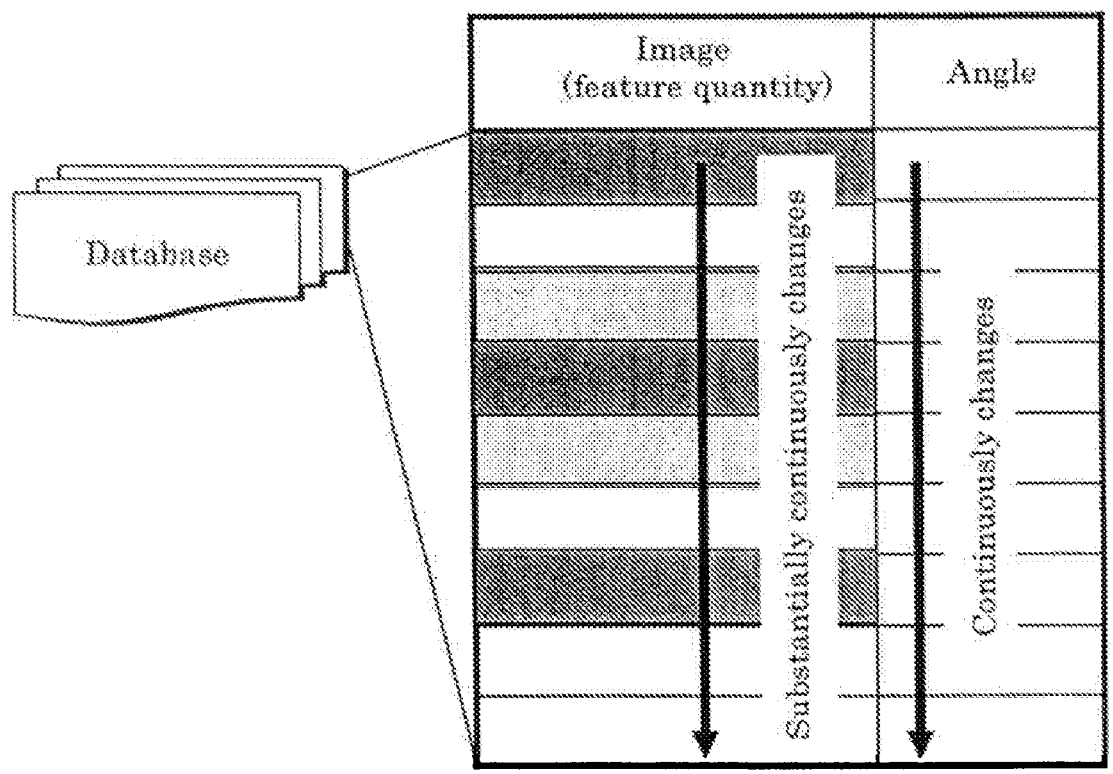
FIG. 27 is a diagram used for illustrating clustering.

FIG. 27 is a schematic view for illustrating the clustering. In FIG. 27, one row represents one set constituted of a plurality of image data. Rows marked with heavy shadow is the data as the object of first search; and rows marked with a light shadow is the data as the object of detailed search. When the data included in the database is generated using the above-described algorithm used in creation of the database, the data similar to the shape of the hand are collected in the array of image data. Utilizing the above, the image data as the object of distance calculation is reduced. In particular, a plurality of image data is handled as a set. And, as for the image data used for the first distance calculation, one set each is selected from the plurality of sets, and distance from the selected image data is calculated. Owing to this, the calculation cost for the distance calculation is reduced by "the number of the data included in the respective sets −1" included in every set resulting in a large cost reduction. However, in this step, since there is a possibility that image data with angle similar to the real angle may be excluded from the calculation, compared to the case where the estimation result is compared to every image data in the original database, the accuracy is degraded. Therefore, in the distance calculation of the first step, as for the image data of which distance is close, the distance is calculated between every image data included in a set that includes the image data and the operational image data. By adapting like this, in the vicinity of the respective data, the image data having similar angle are collected; estimation result with more satisfactory accuracy can be obtained. An experiment to verify the effect of the clustering was conducted under the following conditions; i.e., preparing sets of image data each including ten image data respectively, distance in the first step was calculated between one operational image data and one image data included in plural sets; and then, on every image data included in the upper five sets of which distance obtained by the above processing is close to each other, distance calculation and angle limitation were made to estimate the final angle. As a result, it was verified that satisfactory accuracy with substantially same level as the case where comparison is made on every image data can be obtained.

In the above-described embodiment, to obtain feature quantity, the higher order local autocorrelation function is used. However, needless to say that another method for calculating feature quantity may be employed. For example, a method of calculating of feature quantity vector disclosed in "Display model for large scale collective image"; Hiroike Atsushi, Musya Yoshinori, (Society of Photographic Science and Technology of Japan, Vol. 66, 1, pp. 93 to 101, 2003) may be employed. Industrial Applicability

INDUSTRIAL APPLICABILITY

According to the present invention, to have a robot actually perform an operation, only by obtaining images of a moving object corresponding to the robot or an imitation of the moving object, ill-posed problem can be eliminated and the robot can be made to perform imitation movement of the same movement as the moving object or imitation of the moving object without using sensors. Therefore, according to the present invention, robots can be simply driven using image data as the input data.

The invention claimed is:

1. A method for driving a robot according to an operation command comprising:
    a first step for providing a moving object, corresponding to the robot, a plurality of sensors for detecting movement of the moving object and an operation command generating device for generating the operation command based on output from the plurality of sensors, and storing a pre-arranged operation command of the operation command which the operation command generating device generates based on the output from the plurality of sensors while the moving object performs a same movement as a predetermined movement;
    a second step for obtaining an operational image data of the moving object, the operational image data being obtained while the moving object is moved in a desired movement or for obtaining the operational image data of the moving object or the imitation thereof, the operational image data being obtained in time series while the moving object or the imitation thereof is moved in a desired movement;
    a third step for storing the image data and the pre-arranged operation command in an image corresponding operation command storing means, the image data being associated with the pre-arranged operation command;
    a fourth step for obtaining an operational image data of the moving object or the imitation thereof as a robot operational image data, the operational image data being obtained in time series while the moving object or the imitation thereof is moved in a desired movement in order to have the robot perform the desired movement;
    a fifth step for specifying an image data corresponding to the operational image data included in the robot operational image data among the image data stored in the image corresponding operation command storing means and providing the pre-arranged operation command corresponding to the specified image data to the robot as the operation command.

2. The method for driving a robot as defined in claim 1, wherein in the fifth step, a similarity between the operational image data stored in the image corresponding operation command storing means and the image data included in the robot operational image data is used for determining a correspondence between the image data stored in the image corresponding operation command storing means and the operational image data included in the robot operational image data.

3. The method for driving a robot as defined in claim 1, wherein the moving object is a human hand,
    in the first step, a data glove is provided on the human hand, the data glove has a structure where the sensors are arranged at positions on a glove body, the positions corresponding to moving parts of the human hand which correspond to moving parts of a hand of the robot.

4. The method for driving a robot as defined in claim 1, wherein the moving object is a human hand,
    in the first step, a data glove is provided on the human hand, the data glove has a structure that the sensors are arranged at positions on a glove body, the positions corresponding to moving parts of the human hand which correspond to moving parts of the robot hand;
    in the second step, a plain glove is provided on the human hand with the data glove, the image data of the human hand which performs a predetermined movement at a same time when the first step is performed.

5. The method for driving a robot as defined in claim 1, wherein the imitation of the moving object is created by a imitation creating technique such as a computer graphics technique or the like and the image data is an imitation image data.

6. The method for driving a robot as defined in claim 1, wherein the imitation of the moving object is created by a computer graphics technique and an image data of the imitation is a computer graphics image data.

7. The method for driving a robot as defined in claim 1, wherein in the second step, the moving object is covered with a cover for covering an outer surface of the moving object with the sensors and the image data of the moving object is obtained at a same time when the first step is performed.

8. The method for driving a robot as defined in claim 5 or 6, wherein the moving object is a human hand and the image data obtained in the second step includes an individual image data created by considering the difference in physical figure of the human hand.

9. The method for driving a robot as defined in claim 5, 6 or 7 wherein the image data includes resolution modified image data made by changing the resolution of the image data.

10. The method for driving a robot as defined in claim 6, wherein in the second step, the image data includes imitation image data between the one image data and the following image data which is obtained after the one image data has been obtained in time series, the imitation image data being created by the computer graphics technique;
    in the third step, a pre-arranged operation command is stored having a corresponding relationship with the imitation image data, the pre-arranged operation command corresponding to the imitation image data being created based on the one pre-arranged operation command corresponding to the one image data and the following pre-arranged operation command corresponding to the following image data.

11. The method for driving a robot as defined in claim 10, the third step comprising steps of:
    calculating the feature quantity of each of the image data,
    calculating a principal component score of each of the image data by a principal component analysis on the feature quantity of each of the image data, determining the number of principal components from a first principal component to a k-th principal component based on a cumulative contribution ratio of the principal component analysis, and storing k-kinds of image data source respectively corresponding to the principal components from the first principal component to the k-th principal component, each of the k-kinds of image data source being obtained by sorting the image data based on each of the principal component scores; and in the fifth step, the image data for matching is extracted from the k-kinds of image data source based on the principal component score, the principal component scores being obtained for each of the operational image data and a plural kinds of changed operational image data which have different resolutions from the operational image data.

12. The method for driving a robot as defined in claim 1, wherein in the fifth step, when an image data corresponding to the operational image data included in the robot operational image data is specified among the image data stored in the image corresponding operation command storing means, a plurality of image data for matching are selected depending on feature quantity of the operational image data and an image data corresponding to the operational image data is specified based on a similarity between the image data for matching and the operational image data.

13. The method for driving a robot as defined in claim 12, the feature of the operational image data is a principal component score on each principal component obtained by a principal component analysis on the operational image data.

\* \* \* \* \*